United States Patent
Burceanu et al.

(10) Patent No.: US 11,604,893 B2
(45) Date of Patent: Mar. 14, 2023

(54) PRIVACY-PRESERVING IMAGE DISTRIBUTION

(71) Applicant: Bitdefender IPR Management Ltd., Nicosia (CY)

(72) Inventors: Elena Burceanu, Buchare (RO);
Madalina Bolboceanu, Focsani (RO);
Emanuela Haller, Buchare (RO);
Georgiana M Rosca, Buchare (RO);
Bogdan C Cebere, Buchare (RO);
Radu Titiu, Buchare (RO)

(73) Assignee: Bitdefender IPR Management Ltd., Nicosia (CY)

( * ) Notice: Subject to any disclaimer, the term of this patent is extended or adjusted under 35 U.S.C. 154(b) by 60 days.

(21) Appl. No.: 17/305,322

(22) Filed: Jul. 5, 2021

(65) Prior Publication Data

US 2022/0012366 A1    Jan. 13, 2022

Related U.S. Application Data

(60) Provisional application No. 62/705,604, filed on Jul. 7, 2020.

(51) Int. Cl.
| | |
|---|---|
| *G06F 21/00* | (2013.01) |
| *G06F 21/62* | (2013.01) |
| *H04L 67/10* | (2022.01) |
| *H04L 9/00* | (2022.01) |
| *H04L 9/08* | (2006.01) |
| *G06T 7/11* | (2017.01) |
| *G06F 21/60* | (2013.01) |

(Continued)

(52) U.S. Cl.
CPC ........ *G06F 21/6245* (2013.01); *G06F 21/602* (2013.01); *G06F 21/6263* (2013.01); *G06T 7/11* (2017.01); *H04L 9/008* (2013.01); *H04L 9/0891* (2013.01); *H04L 67/10* (2013.01); *G06V 40/161* (2022.01); *H04L 2209/04* (2013.01); *H04N 7/183* (2013.01)

(58) Field of Classification Search
None
See application file for complete search history.

(56) References Cited

U.S. PATENT DOCUMENTS

| | | |
|---|---|---|
| 8,666,110 B2 | 3/2014 | Yoo et al. |
| 8,972,742 B2 | 3/2015 | Troncoso Pastoriza et al. |
| 9,582,709 B2 | 2/2017 | Wang et al. |

(Continued)

OTHER PUBLICATIONS

Lin et al., "Privacy-preserving photo sharing based on a public key infrastructure", Proceedings of SPIE, IEEE, US, vol. 9599, Sep. 22, 2015, pp. 1-13, XP060060842, DOI: 10.1117/12.2190458, ISBN: 978-1-62841-730-2 (Year: 2015).*

(Continued)

*Primary Examiner* — Andrew J Steinle
(74) *Attorney, Agent, or Firm* — Law Office of Andrei D Popovici, PC

(57) ABSTRACT

Some embodiments enable distributing data (e.g., recorded video, photographs, recorded audio, etc.) to a plurality of users in a manner which preserves the privacy of the respective users. Some embodiments leverage homomorphic encryption and proxy re-encryption techniques to manipulate the respective data so that selected portions of it are revealed according to an identity of the user currently accessing the respective data.

19 Claims, 15 Drawing Sheets

(51) Int. Cl.
*H04N 7/18* (2006.01)
*G06V 40/16* (2022.01)

(56) References Cited

U.S. PATENT DOCUMENTS

| | | | |
|---|---|---|---|
| 10,565,395 B2 | 2/2020 | Matusek et al. | |
| 2010/0211799 A1* | 8/2010 | Gladstone | H04L 9/0894 |
| | | | 713/189 |
| 2012/0030165 A1* | 2/2012 | Guirguis | G06F 21/6209 |
| | | | 707/E17.007 |
| 2013/0170640 A1 | 7/2013 | Gentry | |
| 2014/0359652 A1 | 12/2014 | Ghorbel et al. | |
| 2016/0294781 A1* | 10/2016 | Ninan | H04L 63/0428 |
| 2018/0139054 A1 | 5/2018 | Chu et al. | |
| 2018/0261307 A1 | 9/2018 | Couse et al. | |

OTHER PUBLICATIONS

Burceanu, U.S. Appl. No. 17/305,324, filed Jul. 5, 2021.
European Patent Office (EPO), International Search Report and Written Opinion dated Oct. 18, 2021 for PCT International Application No. PCT/EP2021/068655, international filing date Jul. 6, 2021, priority date Jul. 7, 2020.
European Patent Office (EPO), International Search Report and Written Opinion dated Oct. 18, 2021 for PCT International Application No. PCT/EP2021/068657, international filing date Jul. 6, 2021, priority date Jul. 7, 2020.
Yuan Lin et al., "Privacy-preserving photo sharing based on a public key infrastructure," Proceedings of SPIE, IEEE, US, vol. 9599, pp. 1-13, Sep. 22, 2015.
Picazo-Sanchez et al., "Secure Photo Sharing in Social Networks," ICT Systems Security and Privacy Protection, 32nd IFIP TC 11 International Conference, SEC 2017, Rome, Italy, Proceedings, May 29-31, 2017.
Yamac Mehmet et al., "Reversible Privacy Preservation using Multi-Level Encryption and Compressive Sensing," 2019 27th European Signal Processing Conference (EUSIPCO), EURASIP, pp. 1-5, Sep. 2, 2019.
Xiang Tao et al., "Outsourcing chaotic selective image encryption to the cloud with steganography," Digital Signal Processing, Academic Press, Orlando, FL, US, vol. 43, pp. 28-37, May 11, 2015.
Engelsma et al., "HERS: Homomorphically Encrypted Representation Search," arXiv:2003.12197v3, Jun. 18, 2022.
Bellafqira et al., "An End to End Secure CBIR over Encrypted Medical Database," 2016 38th Annual International Conference of the IEEE Engineering in Medicine and Biology Society (EMBC), Aug. 2016.

* cited by examiner

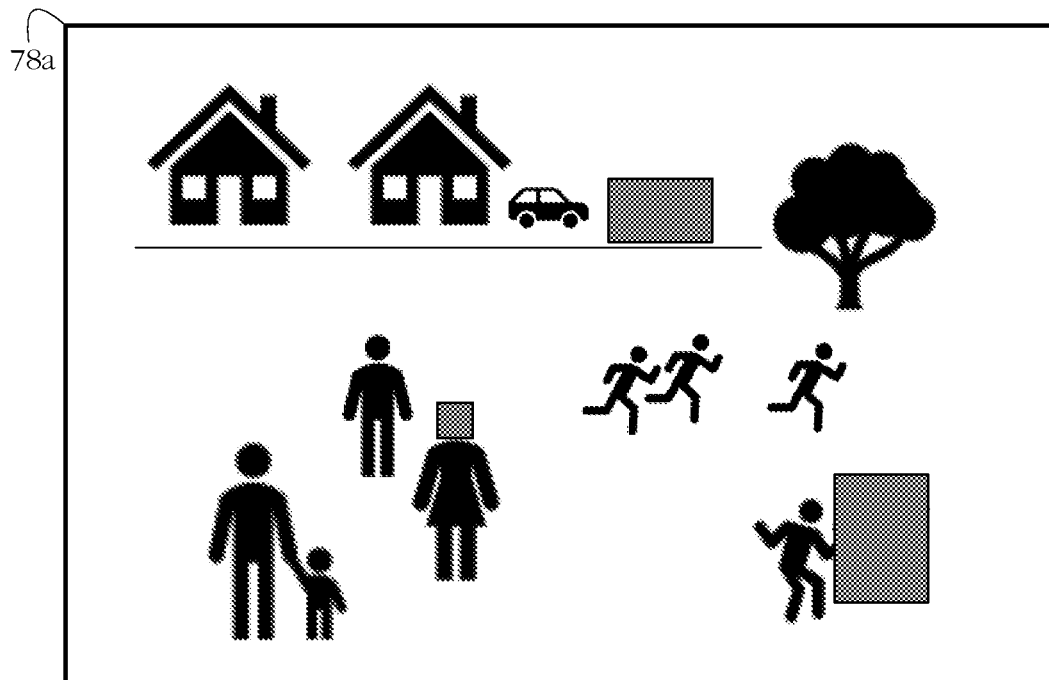
FIG. 17-A
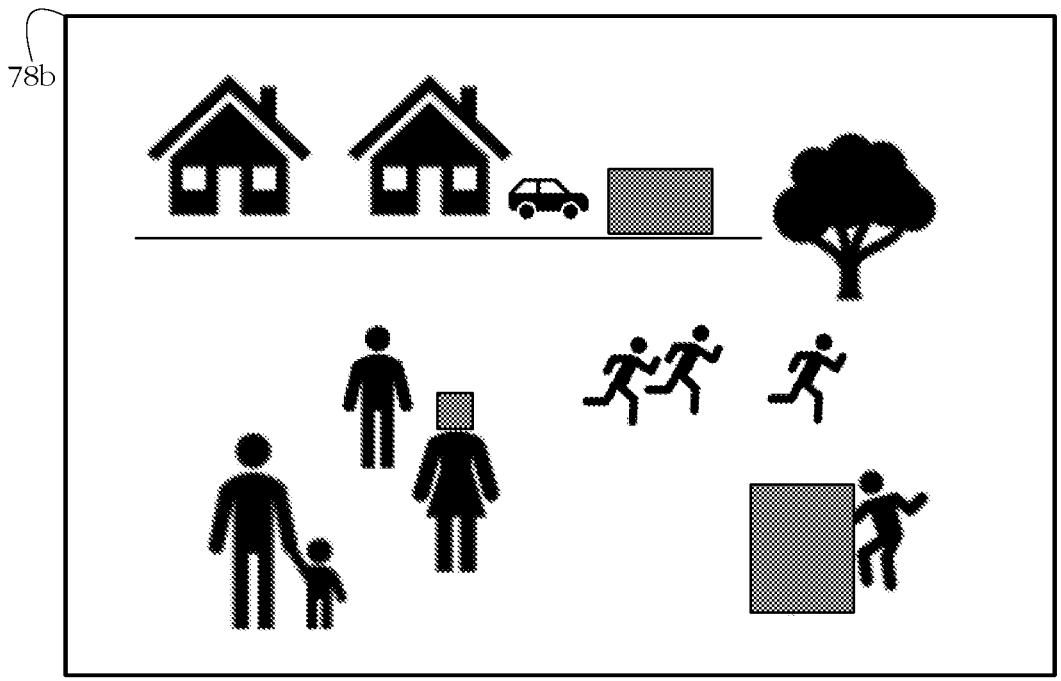
FIG. 17-B

PRIVACY-PRESERVING IMAGE DISTRIBUTION

RELATED APPLICATIONS

This application claims the benefit of the filing date of U.S. provisional patent application No. 62/705,604, filed on Jul. 7, 2020, entitled "Privacy-Preserving Surveillance Systems and Methods," the entire contents of which are incorporated by reference herein.

BACKGROUND

The present invention relates to image processing, and in particular to employing cryptographic manipulations to distribute an image to multiple users in a manner which preserves the privacy of selected users.

Recent advances in imaging technology and artificial intelligence have led to an explosion of digital surveillance. Video surveillance of public spaces has been traditionally used by police to prevent crime. Surveillance cameras are also increasingly being used on private property, in shops, offices, and schools. Data collected by the cameras is often further processed to extract various features, for instance a vehicle license plate or an identity of a person appearing in a particular image.

Extensive use of such technologies has raised some concerns. Pro-democracy activists have accused some governments of using surveillance to target political opponents, dissidents, specific social and ethnic groups. In recent years, the public at large has also become less accepting of mass surveillance, increasingly seeing it as an invasion of privacy.

There is therefore a substantial interest in developing privacy-preserving video surveillance systems and methods.

SUMMARY

According to one aspect, a method of distributing customized privacy-preserving images to a plurality of users comprises employing at least one hardware processor of a privacy management server, in response to receiving an encrypted source image decryptable with an administration key, to perform an encrypted-domain image segmentation of the source image to produce a plurality of user-specific encrypted private images. A selected private image comprises a region of the source image selected to show a private item of a selected user of the plurality of users, and another private image comprises another region of the source image selected to show a private item of another user of the plurality of users. The method further comprises employing at least one hardware processor of the privacy management server, in response to the image segmentation, to perform an encrypted-domain key change procedure to produce a plurality of user-specific re-encrypted images. A selected re-encrypted image comprises a result of transforming the selected private image from being decryptable with the administration key to being decryptable with a private key of the selected user, and another re-encrypted image comprises a result of transforming the other private image from being decryptable with the administration key to being decryptable with a private key of the other user. The method further comprises employing at least one hardware processor of the privacy management server to transmit the plurality of user-specific re-encrypted images to an image distribution server for further distribution to client devices configured to reconstruct user-specific plaintext versions of the source image.

According to another aspect, a computer system comprises a privacy management server configured, in response to receiving an encrypted source image decryptable with an administration key, to perform an encrypted-domain image segmentation of the source image to produce a plurality of user-specific private images. A selected private image comprises a region of the source image selected to show a private item of a selected user of the plurality of users, and another private image comprises another region of the source image selected to show a private item of another user of the plurality of users. The privacy management server is further configured, in response to the image segmentation, to perform an encrypted-domain key change procedure to produce a plurality of user-specific re-encrypted images. A selected re-encrypted image comprises a result of transforming the selected private image from being decryptable with the administration key to being decryptable with a private key of the selected user, and another re-encrypted image comprises a result of transforming the other private image from being decryptable with the administration key to being decryptable with a private key of the other user. The privacy management server is further configured to transmit the plurality of user-specific re-encrypted images to an image distribution server for further distribution to client devices configured to reconstruct user-specific plaintext versions of the source image.

According to another aspect, a non-transitory computer-readable medium stores instructions which, when executed by at least one hardware processor of a privacy management server, cause the privacy management server, in response to receiving an encrypted source image decryptable with an administration key, to perform an encrypted-domain image segmentation of the source image to produce a plurality of user-specific private images. A selected private image comprises a region of the source image selected to show a private item of a selected user of the plurality of users, and another private image comprises another region of the source image selected to show a private item of another user of the plurality of users. The instructions further cause the privacy management server, in response to the image segmentation, to perform an encrypted-domain key change procedure to produce a set of user-specific re-encrypted images. A selected re-encrypted image comprises a result of transforming the selected private image from being decryptable with the administration key to being decryptable with a private key of the selected user, and another re-encrypted image comprises a result of transforming the other private image from being decryptable with the administration key to being decryptable with a private key of the other user. The instructions further cause the privacy management server to transmit the plurality of user-specific re-encrypted images to an image distribution server for further distribution to client devices configured to reconstruct user-specific plaintext versions of the source image.s

BRIEF DESCRIPTION OF THE DRAWINGS

The foregoing aspects and advantages of the present invention will become better understood upon reading the following detailed description and upon reference to the drawings where:

FIG. 17-A shows an exemplary reconstructed image available to a selected client device according to some embodiments of the present invention.

FIG. 17-B shows another exemplary reconstructed image available to another client device according to some embodiments of the present invention.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise specified, any use of "OR" refers to a non-exclusive or. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. The term 'database' is herein used to denote any structured collection of data. Carrying out an encrypted-domain procedure/operation herein denote carrying out the respective procedure/operation in the encrypted domain, i.e., directly on an encrypted input to produce an encrypted output in a manner which does not involve decrypting the input. An encrypted domain procedure is distinct from a procedure that decrypts the input and then encrypts the output of the respective procedure. Stated otherwise, an entity carrying out an encrypted-domain procedure/operation on an encrypted item need not be aware of a plaintext version of the respective item. Computer readable media encompass non-transitory media such as magnetic, optic, and semiconductor storage media (e.g. hard drives, optical disks, flash memory, DRAM), as well as communication links such as conductive cables and fiber optic links. According to some embodiments, the present invention provides, inter alia, computer systems comprising hardware (e.g., one or more processors) programmed to perform the methods described herein, as well as computer-readable media encoding instructions to perform the methods described herein.

The following description illustrates embodiments of the invention by way of example and not necessarily by way of limitation.

Figure 1:
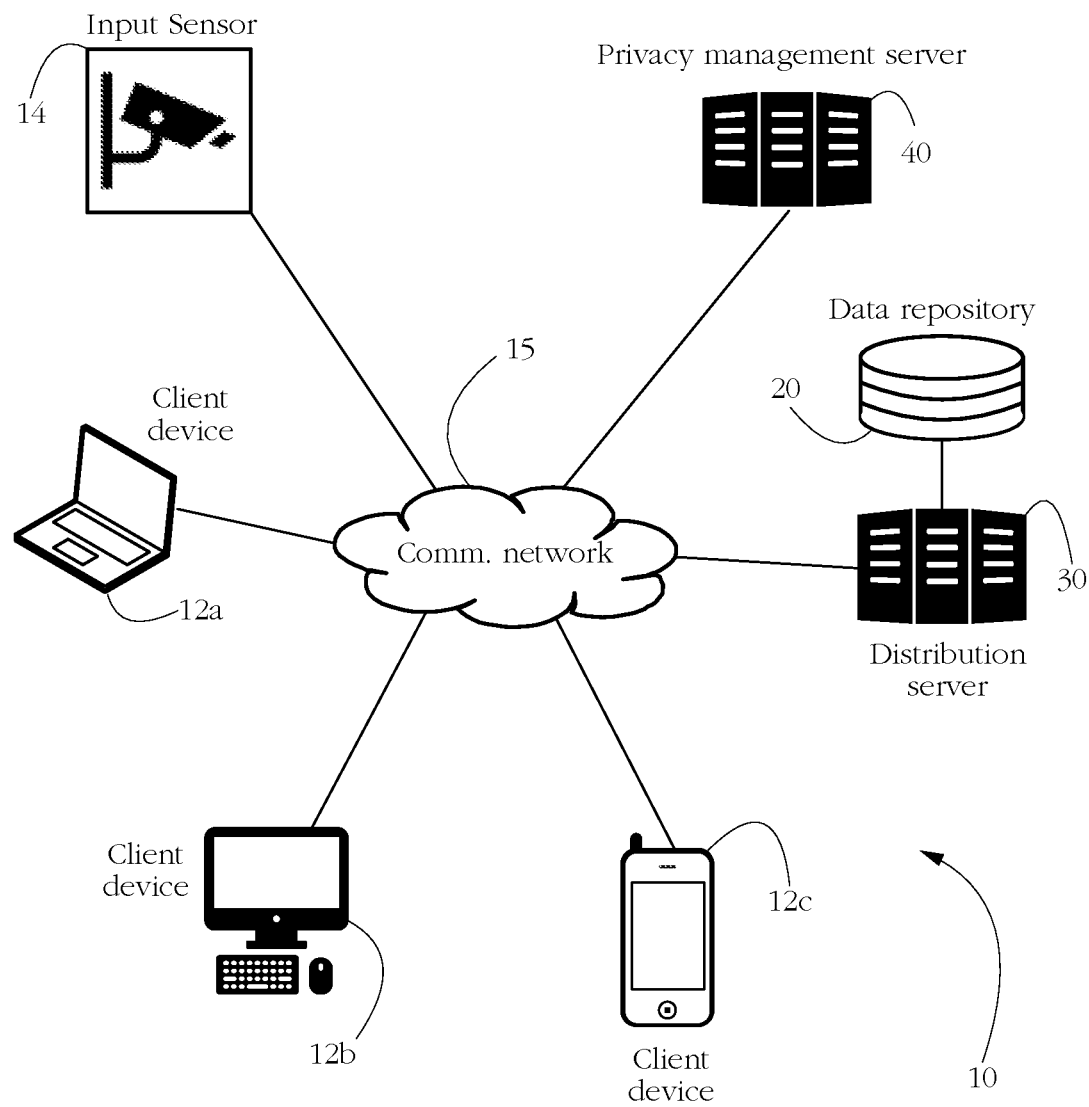
FIG. 1 shows an exemplary privacy-preserving surveillance system according to some embodiments of the present invention.

FIG. 1 shows an exemplary privacy-preserving surveillance system 10 according to some embodiments of the present invention. The term "surveillance" is used herein only to bring clarity to the disclosure by focusing on a particular exemplary use case and is not meant to be limiting to typical surveillance activities such as preventing crime. Although the following description will focus on a video surveillance example, the disclosed systems and methods may be adapted to other applications, such as preserving privacy and/or ensuring confidentiality during a collaboration between multiple parties working on the same document, preventing cyber-bullying perpetrated via online messaging, etc.

System 10 includes, inter alia, an input sensor 14, a distribution server 30, a privacy management server 40, and a plurality of client devices 12a-c, all communicatively coupled by a network 15, which may include the Internet.

Figure 2:
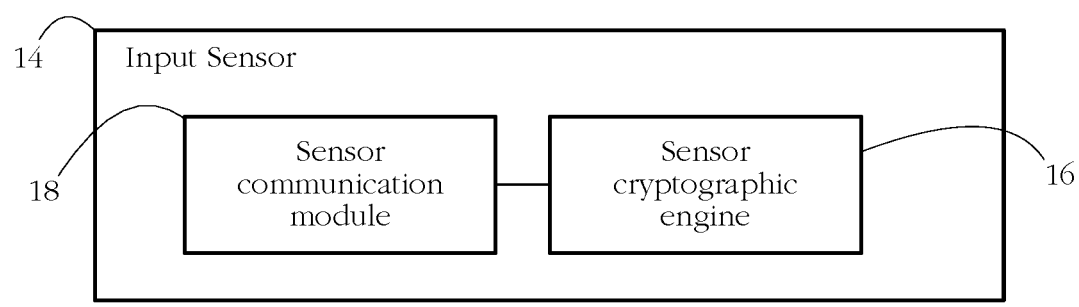
FIG. 2 shows exemplary components of an input sensor according to some embodiments of the present invention.

Sensor 14 (e.g., a camera, a microphone, etc.) is configured to acquire a signal (e.g., an encoding of an image and/or a sound) which is further manipulated and transformed as described below. In a video surveillance example, sensor 14 may comprise a video camera positioned to acquire images of a public space, such as a schoolyard, a market square, etc. As such, sensor 14 may include hardware and/or software means for acquiring a signal (e.g., a charge-coupled device—CCD light sensor), computer-readable media for storing the acquired signal, and means for transmitting the respective signal (e.g., physical layer communication hardware, encoders, antenna, etc.). FIG. 2 shows other exemplary components of input sensor 14, which may comprise dedicated software modules according to some embodiments of the present invention. A cryptographic engine 16 encrypts acquired images/sound recordings. A communication module 18 further transmits the resulting encrypted signals to privacy management server 40 and/or image distribution server 30 as detailed below.

In some embodiments, cryptographic engine 16 encrypts data according to a homomorphic encryption scheme. Homomorphic encryption is a particular kind of encryption which allows performing certain calculations such as additions and/or multiplications of encrypted data, wherein decrypting a result of such calculations produces the same output as applying the respective calculations to a plaintext version of the same data. Stated otherwise, if Enc(p)=c denotes a homomorphic encryption operation wherein p represents a plaintext message and c denotes its corresponding ciphertext, Dec(c)=p denotes a homomorphic decryption operation that recovers the respective plaintext message from its ciphertext, and Eval (F, $\{c_1, \ldots, c_k\}$)=C denotes a homomorphic evaluation procedure producing a ciphertext C by applying a function F to a set of ciphertexts $c_i$, then:

$$Dec(C)=F(p_1, \ldots ,p_k), \quad [1]$$

wherein $p_i$=Dec($c_i$), i=1, . . . , k. In formal mathematical language, it is said that the encryption and decryption procedures of a homomorphic encryption scheme are homomorphisms between the plaintext space and ciphertext space.

Several homomorphic encryption schemes/cryptosystems are known in the art. Schemes that preserve the homomorphic property over any combination of additions and multiplications are commonly known as fully homomorphic. Examples include the Gentry-Sahai-Waters (GSW) scheme, among others. Other schemes/algorithms are homomorphic only over a certain type of operation, for instance only addition in the case of a Paillier scheme, and only multiplication in the case of a Rivest-Shamir-Adelman (RSA) scheme. Such schemes are known in the art as partially homomorphic. In contrast, ciphers that do not have the homomorphic property described above are herein deemed non-homomorphic. Examples of non-homomorphic ciphers include the Advanced Encryption Standard (AES) used in some Transport Layer Security (TLS) communication protocols.

Figure 3:
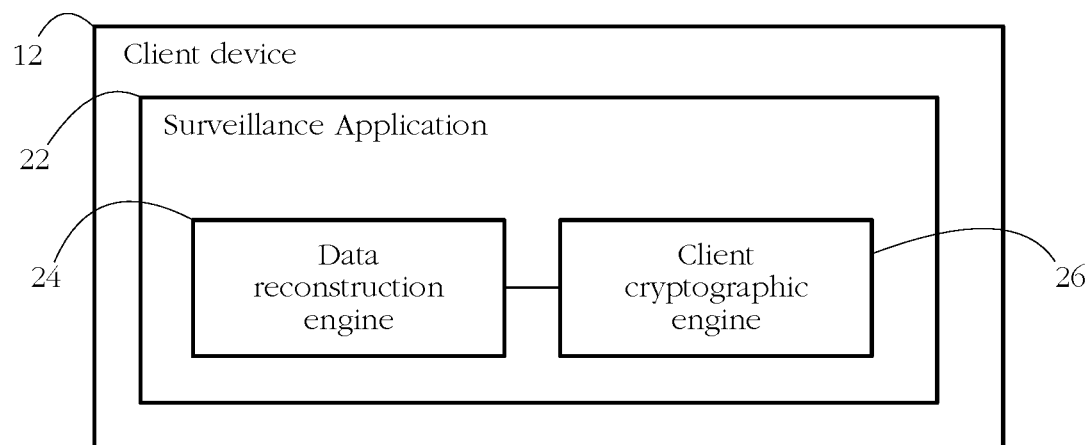
FIG. 3 shows exemplary components of a client device according to some embodiments of the present invention.

Client devices 12a-c generically represent any end-user electronic device such as a personal computer, smartphone, TV, etc., used to access and/or process (e.g., visualize, play back, etc.) data provided by input sensor 14. In some embodiments as illustrated in FIG. 3, a client device 12 may execute a surveillance software application 22 configured to perform a user authentication exchange (e.g., login procedure) with distribution server 30 and to subsequently display a reconstructed image to a user. A data reconstruction engine 24 is configured to reconstruct an image from a set of plaintext public images and a set of encrypted private images as described below. A client cryptographic engine 26 is configured to decrypt the received encrypted private image(s). In some embodiments, engine 26 implements a homomorphic decryption algorithm.

Figure 4:
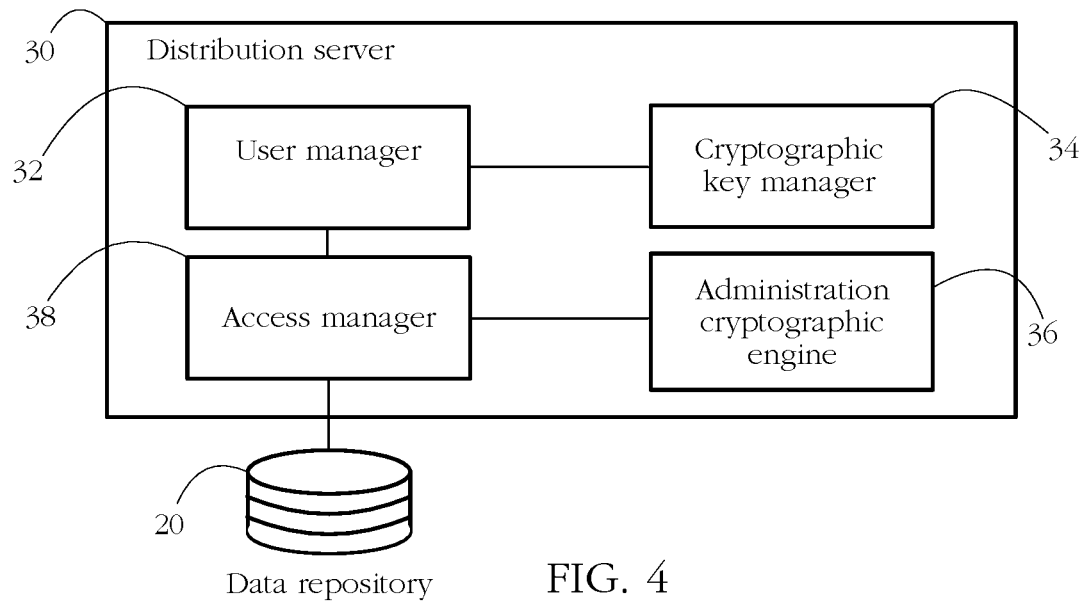
FIG. 4 shows exemplary components of an image distribution server according to some embodiments of the present invention.
Figure 5:
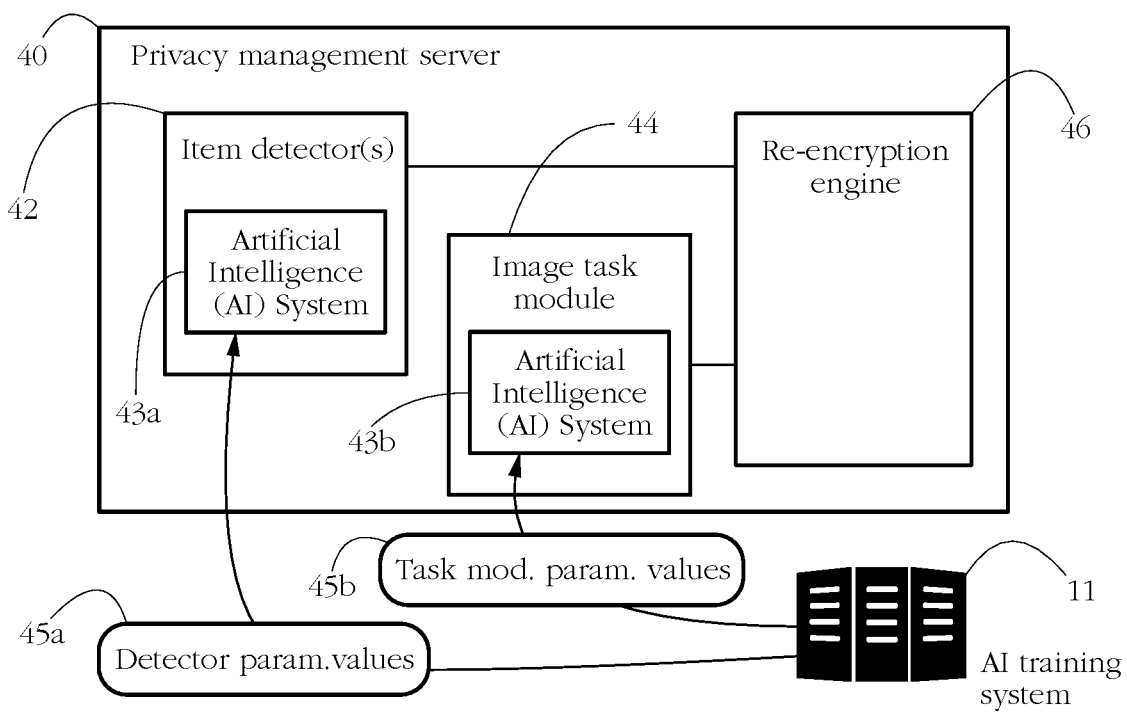
FIG. 5 shows exemplary components of a privacy management server according to some embodiments of the present invention.

Each of distribution server 30 and privacy management server 40 generically represents a set of interconnected computer systems, which may or may not be in physical proximity to each other. Exemplary components of servers 30 and 40 are shown in FIGS. 4 and 5, respectively. In some embodiments, such components represent computer programs (software) executing on at least a hardware processor. Not all illustrated components need to execute on the same hardware processor or physical machine. A skilled artisan will understand that in alternative embodiments, some of the illustrated components may be implemented in dedicated hardware such as application-specific integrated circuits (ASIC) and/or field-programmable gate arrays (FPGA), in firmware, on in a combination of the above.

In some embodiments, distribution server 30 manages a surveillance service including, for instance, communication with client devices 12a-c for user registration and/or authentication, as well as distribution of selectively-encrypted data to each client device. Without loss of generality, server 30 may be herein referred to as an image distribution server, i.e., a server configured to distribute images (e.g., video) to clients. An artisan will appreciate that depending on the actual embodiment and use case, server 30 may distribute other kinds of data, such as audio, electronic documents, etc. A user manager component 32 may manage a set of user and/or account data (usernames, passwords, various service agreement parameters, etc.) and provide user interfaces for user registration and account management.

An access manager component 38 may selectively store and/or retrieve data to/from a data repository 20 and selectively forward such data to each client device 12a-c according to an identity of a user currently authenticated on the respective client device. Access manager 38 may comprise a web server, among others.

A cryptographic key manager 34 may initiate and/or perform a key generation and exchange procedure with client devices 12a-c and privacy management server 40. Key manager 34 may further generate a set of proxy re-encryption tokens and selectively associate each such token with a registered user of the surveillance service and/or with a client device 12a-c. More details on such processes are given below.

An administration cryptographic engine 36 may be configured to perform data encryption and/or decryption operations as described further below. Engine 36 may implement a version of a homomorphic encryption/decryption algorithm.

In some embodiments, data repository 20 may comprise a computer-readable storage medium configured to store a database of private and public data. Public data may comprise any data that is accessible to all users, for instance a plaintext (i.e., un-encrypted) image. Private data may be accessible and/or decryptable only by selected users. Examples of private data include user-specific and composite proxy re-encrypted images as shown below. Such data may be indexed according to the user to enable selective insertion and retrieval. Indexing may take any form known in the art.

In some embodiments, privacy management server 40 (FIG. 5) provides services such as cryptography and automatic detection of private/confidential items in data provided by input sensor 14. A re-encryption engine 46 of server 40 is configured to perform key-swap procedures on encrypted data, as shown in more detail below. A key-swap procedure herein denotes a procedure of transforming a ciphertext from being decipherable using one key to being decipherable using another key. One example of key-swap procedure is known in the art as proxy re-encryption, which allows an entity Z, given some information about another entity Y, to alter a ciphertext encrypted under a public key of an entity X, thereby making it decryptable by entity Y. Stated otherwise, entity Y can decrypt a ciphertext encrypted under X's public key using its own secret key, but only after the respective cyphertext has been proxy re-encrypted by entity Z using a re-encryption key (also known in the art as a re-encryption token) specific to entity Y. Translating this generic scheme to the exemplary actors illustrated in FIG. 1, some embodiments of privacy management server 40 proxy re-encrypt data already encrypted with a public key of distribution server 30, to make the respective data decryptable by a selected user of a client device 12a-c. The proxy re-encryption procedure employs a re-encryption token specific to the respective user and/or device, for instance a token generated according to a public encryption key of the respective use/device.

In some embodiments, re-encryption engine 46 operates in the encrypted domain, i.e., the respective key-swap procedures are carried out without decrypting the input. To achieve encrypted-domain key-swaps, some embodiments of engine 46 implement proxy re-encryption algorithms that are compatible with homomorphic encryption/decryption algorithms implemented by client devices 12a-c, distribution server 30, and/or input sensor 14. Such algorithms go beyond the scope of the present description; several such examples are known in the art of cryptography, for instance the PALISADE code library available at https://gitlab.com/palisade/palisade-development.

A set of item detectors 42 may be configured to determine whether input data received from sensor 14 (e.g., a frame captured by a surveillance camera) contains a representation of a private/confidential item associated with a selected user. Exemplary private items include a person, a face or some other body part, a logo/trademark, a car license plate, a bank card, a personal ID (e.g., driver's license, passport), a handwritten text, and a person's signature, among others. In embodiments configured to operate with sound, exemplary private items may comprise any item allowing an identification of a person, for instance any voice quality such as timbre, vocal fry, pitch, tempo, inflection, etc. Other exemplary private sound items include utterances of a name and of a selected word (e.g., profanity, racial slur, etc.), a gunshot, a sound of a verbal fight, etc. In embodiments configured to process text documents and/or electronic messages, exemplary private items comprise written names, addresses, financial information such as credit card numbers, etc. Other examples include text written by a selected author, text written on a selected topic, and text written in a selected style or conveying a selected sentiment, among others.

Private items may be user-specific. For instance, in a schoolyard surveillance use case, each parent may define his/her own child as a private item, so the respective child may be visible only to the respective parent. In some embodiments, multiple users may share a private item and/or a single user may have multiple private items. In one such example, all members of a particular user group (e.g., parents of $3^{rd}$ grade children) may be able to see the faces of their child's peers, but other users may not.

Figure 6:
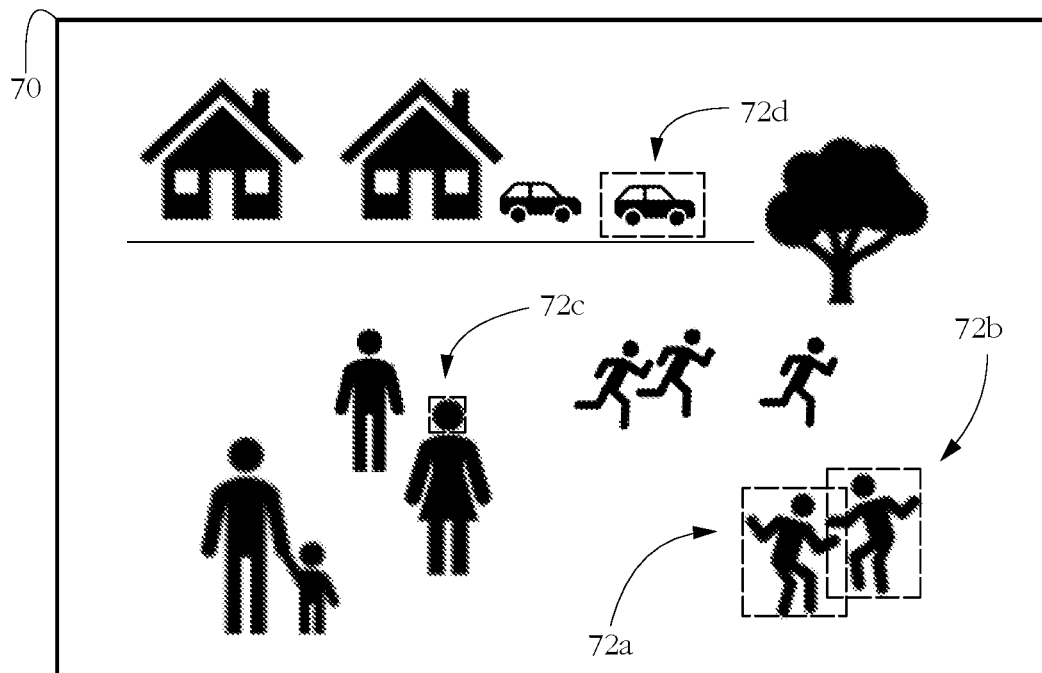
FIG. 6 shows an exemplary source image according to some embodiments of the present invention.
Figure 7:
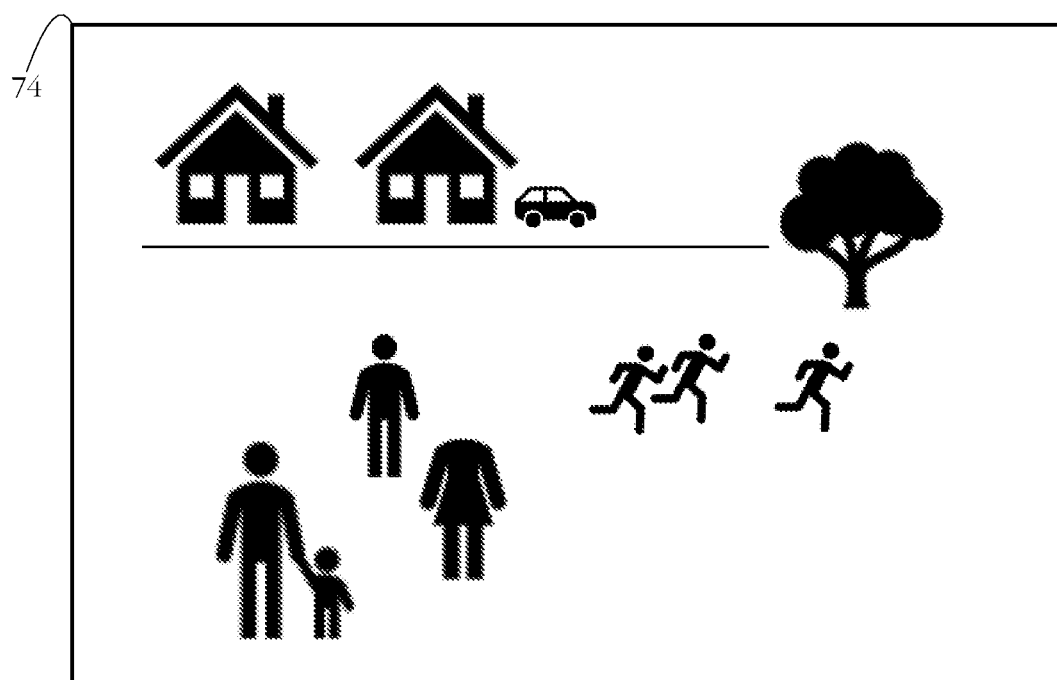
FIG. 7 illustrates an exemplary public image contained within the source image in FIG. 6, according to some embodiments of the present invention.
Figure 8:
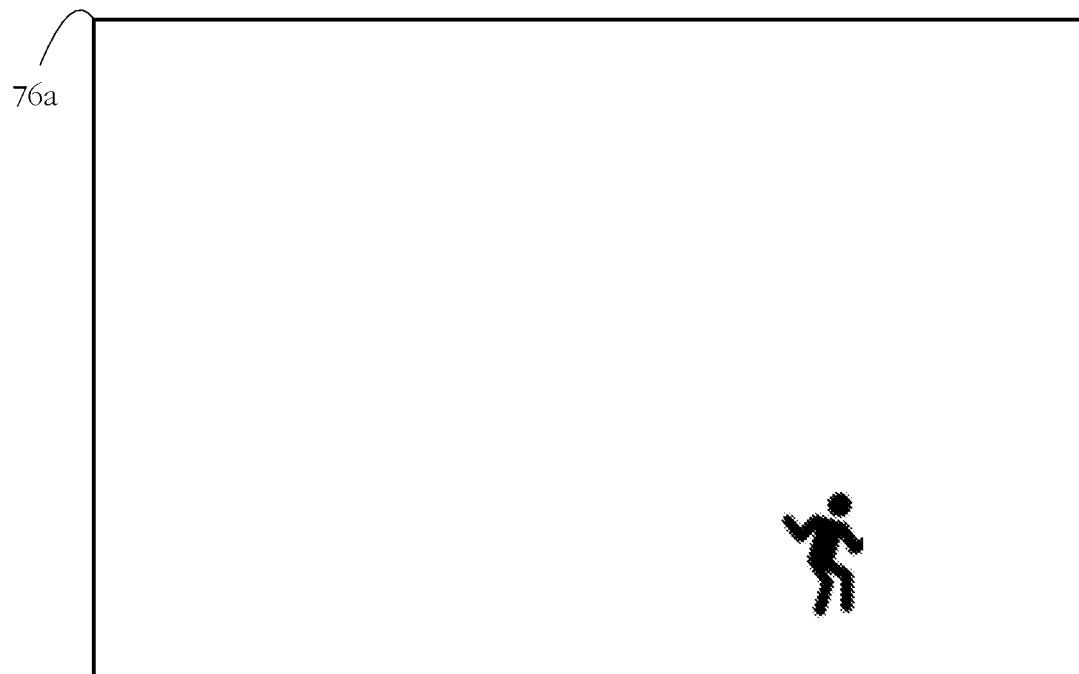
FIG. 8 shows an exemplary private image contained within the source image of FIG. 6, according to some embodiments of the present invention.

FIG. 6 shows an exemplary source image 70 received from a surveillance camera (input sensor 14), image 70 showing exemplary private/confidential items including a person (e.g., children 72a-b), a face 72c and a particular object 72d. FIGS. 7-8 show exemplary public and private images contained in exemplary source image 70. In some embodiments, a private image comprises a representation (e.g., array of numbers) of a private/confidential item. In the example of FIG. 8, a private image 76a comprises a region of the source image showing private item 72a in FIG. 6. In turn, a public image 74 (FIG. 7) may comprise another region of source image 70 that does not show any private item. For instance, public image 74 may show all content of source image 70 which is not private. An exemplary public image includes a background of a scene (landscape, buildings, trees, a courtyard, the sky, etc.) In some embodiments, public image 74 and/or private image(s) 76a are represented as arrays of numbers having the same size as the source image 70.

Item detectors 42 may be constructed using any method known in the art. For instance, an exemplary item detector 42 may include an artificial intelligence (AI) system 43a such as a set of artificial neural networks pre-trained to identify an instance of the respective private item within a source image. Exemplary AI systems 43a include a facial recognition module and an image segmentation module, among others. The structure and training of such item detectors goes beyond the scope of the present description; several architectures and training strategies are known in the art.

Figure 9:
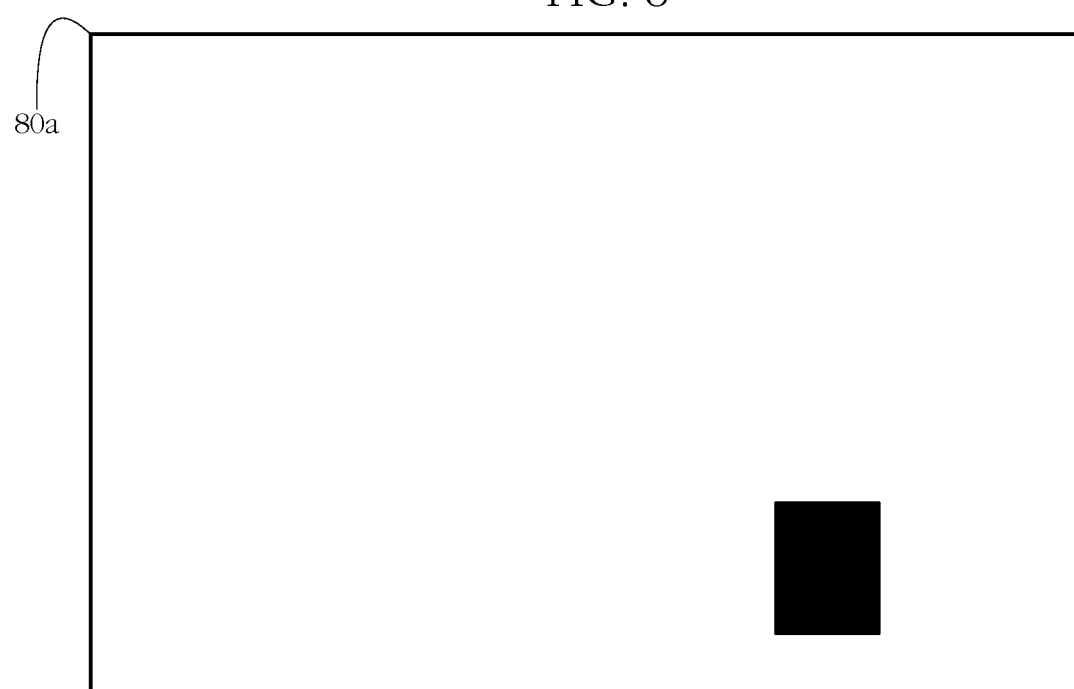
FIG. 9 shows an exemplary user mask according to some embodiments of the present invention.

In an image processing embodiment, an exemplary item detector 42 may receive source image 70 and output a user mask indicative of a region of the source image that shows a representation of a private item (e.g., a region of the source image that shows the face of a specific person). FIG. 9 shows an exemplary user mask 80a associated with private item 72a of FIG. 6. An exemplary user mask is characterized by a subset of pixels belonging to an image of the respective private item. Another exemplary user mask comprises all pixels located inside a contiguous region of source image 70, the region showing the private item. For instance, in an embodiment as illustrated in FIG. 9, such a region may be defined as the inside of a polygon (e.g., convex hull, bounding box, etc.) enclosing the image of the private item. A convenient computer-readable encoding of a user mask comprises a sparse array of numbers, the array having the same size as source image 70 and wherein all elements are zero except elements corresponding to pixels of the mask. Multiple user masks may be associated with a single user (i.e., with a single re-encryption token, see below). Some user masks may overlap.

In some embodiments, detectors 42 operate in the encrypted domain, i.e., without decrypting the source images. To achieve such encrypted-domain operation, AI system 43a (e.g., a neural network that implements facial recognition) may be deliberately structured to be compatible with homomorphic encryption schemes. For instance, detector(s) 42 may receive a homomorphically-encrypted source image and in response, output a homomorphically-encrypted user mask, the user mask encrypted using the same encryption key as the one used to encrypt the source image. Several such AI systems have been described in the art. Examples include CryptoNets described in N. Dowlin et al., "CryptoNets: Applying Neural Networks to Encrypted Data with High Throughput and Accuracy", Proceedings of the $33^{rd}$ International Conference on Machine Learning, New York, N.Y., 2016, JMLR: W&CP vol. 48. In one such example, AI system 43a includes a neural network wherein selected layers are equivalent to polynomials of a pre-determined degree, and wherein typical non-linear activation functions such as rectifier linear units (ReLU) are replaced with polynomial approximations.

In some embodiments, AI system 43a is pre-trained by an AI training system 11 (e.g., machine learning algorithms executing on a processor), using training data provided or otherwise indicated by each user. In one such example, upon registering for the service, each user may provide a sample representation of a respective user's confidential item(s), such as an image of a face or a sample of a person's spoken voice. Some embodiments may then train AI system 43a to identify representations of the respective private items within a data stream received from input sensor 14. A relevant example is training facial recognition software on target faces provided by each user. Training produces a set of optimized detector parameter values 45a which are transmitted to item detector(s) 42. In a neural network embodiment, exemplary parameters 45a include a set of synapse weights and neuron biases, among others.

Figure 10:
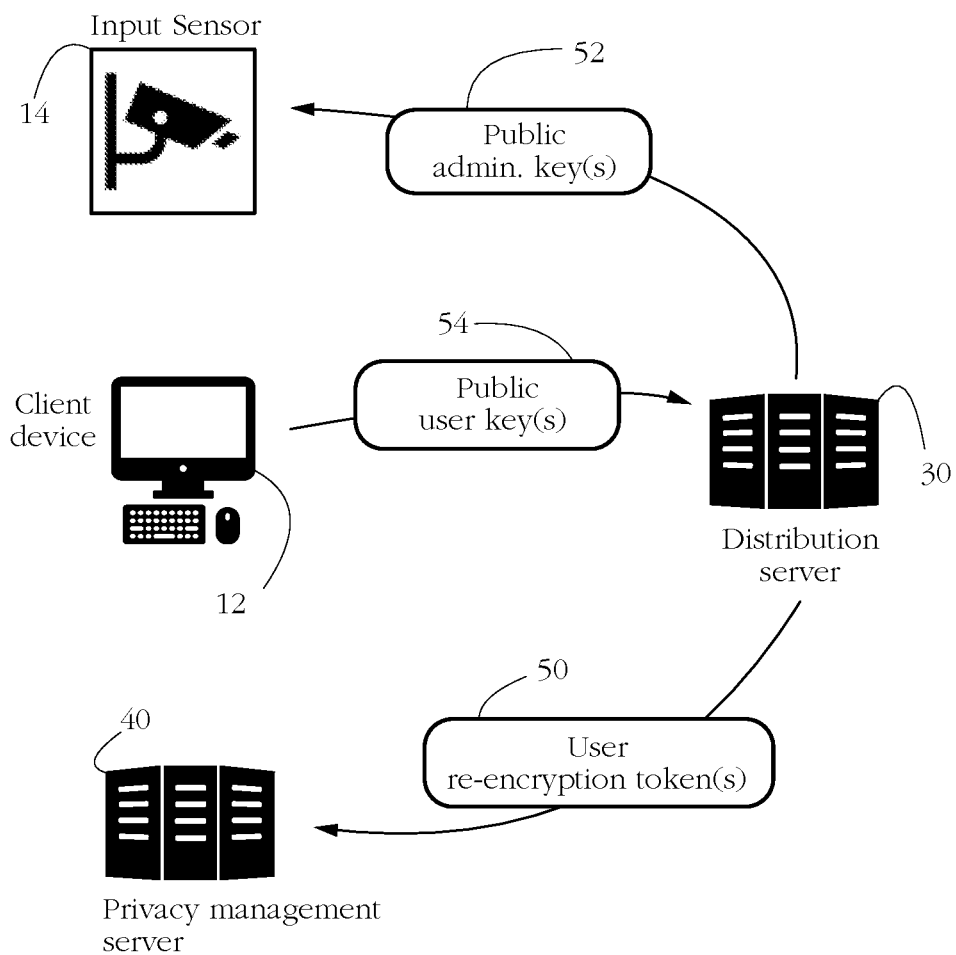
FIG. 10 shows an exemplary data exchange performed to set up a privacy-preserving surveillance system according to some embodiments of the present invention.

FIG. 10 shows an exemplary exchange performed to initialize/set up a privacy-preserving surveillance service according to some embodiments of the present invention. In the illustrated example, distribution server 30 carries out a key generation procedure to produce a pair of homomorphic encryption keys specific to distribution server 30 (herein deemed administration keys) and transmits a public key 52 of the pair to input sensor 14 for use in encrypting the acquired signals/image(s). Server 30 further engages in a key generation and/or exchange protocol with a client device 12 (generically representing any of client devices 12a-c in FIG. 1), wherein device 12 generates a distinct pair of encryption keys specific for each user accessing the privacy-preserving surveillance service via client device 12 (herein deemed user keys). An alternative embodiment may generate device-specific encryption keys. User and/or device key generation may occur at signup as part of each user's initial service configuration procedures, and may proceed according to a homomorphic encryption key generation algorithm. Client device 12 then sends public user key(s) 54 to distribution server 30. In response to receiving key(s) 54, key manager 34 may generate a set of proxy re-encryption token(s) 50 uniquely associated with each user and/or client device. Some embodiments generate each set of user-specific token(s) 50 according to a public key associated with the respective user/device and according to an administration key, via a token generation algorithm which is compatible with the homomorphic encryption algorithm used by client device 12 for generating user/device keys. Such key generation protocols/procedures go beyond the scope of the present description; several examples are known in the art of cryptography. Re-encryption tokens 50 are then transmitted to privacy management server 40 for use in proxy re-encryption of user-specific private images, as detailed below.

Figure 11:
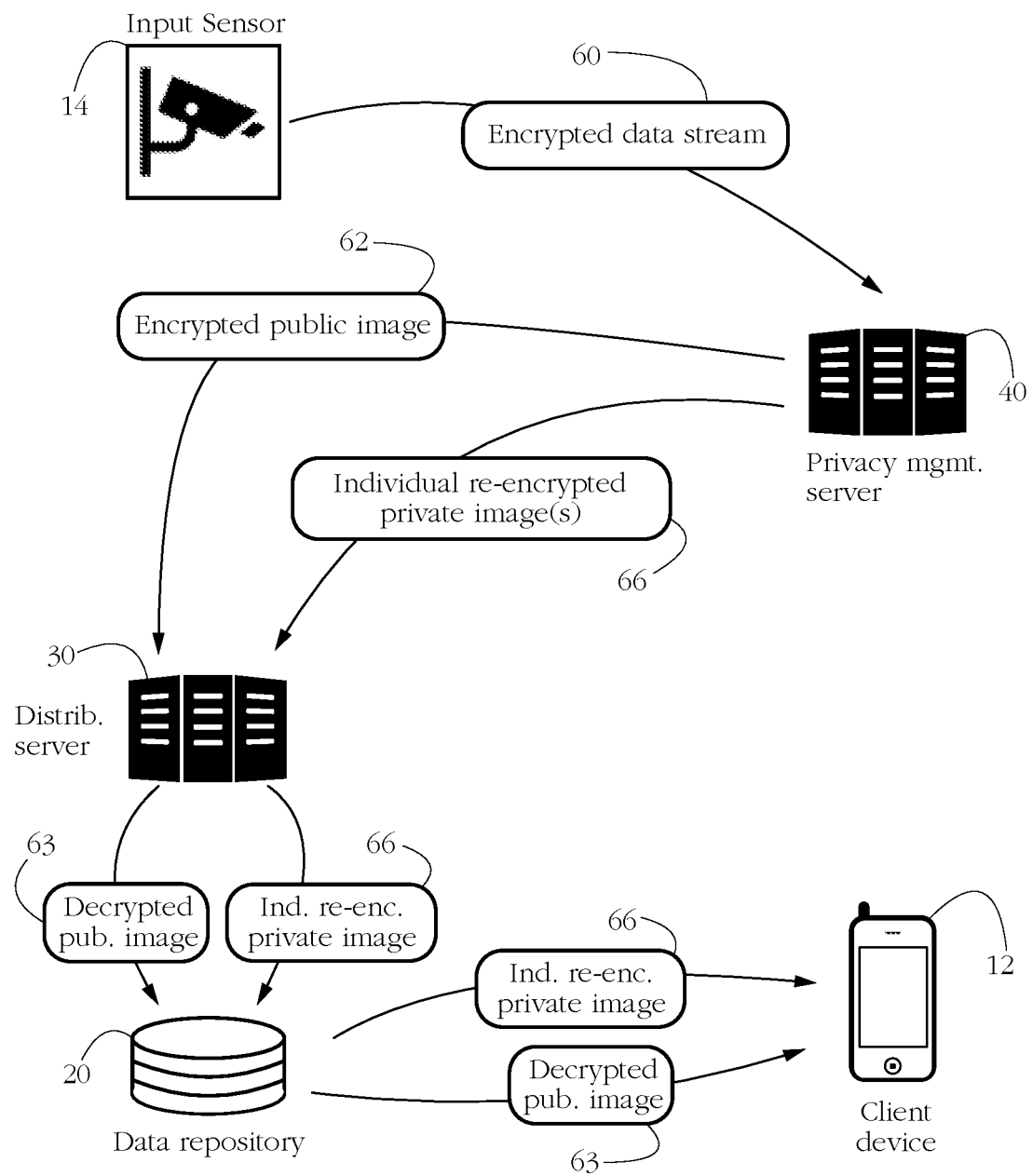
FIG. 11 shows an exemplary data exchange performed during operation of the privacy-preserving surveillance system according to some embodiments of the present invention.
Figure 13:
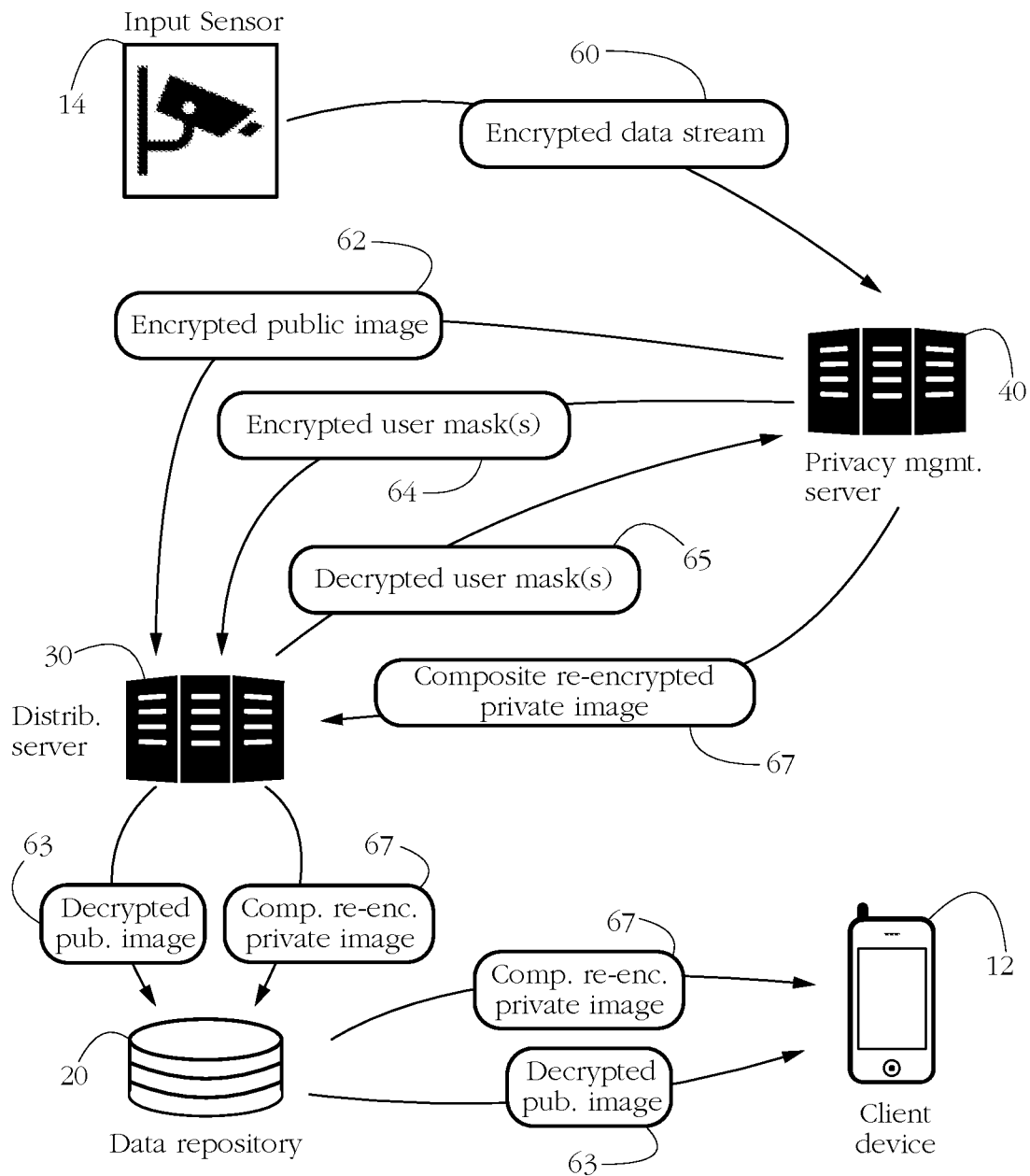
FIG. 13 shows an exemplary data exchange performed in an alternative embodiment of the present invention.

FIGS. 11 and 13 illustrate exchanges of data carried out in two exemplary embodiments of a privacy-preserving surveillance system. For clarity, the following description will focus on video surveillance, i.e., the relevant source data comprises image data. A skilled artisan will understand that the methods described herein may be adapted to other applications wherein the relevant data comprises an encoding of sound (e.g., voice recordings), text, etc.

Figure 12:
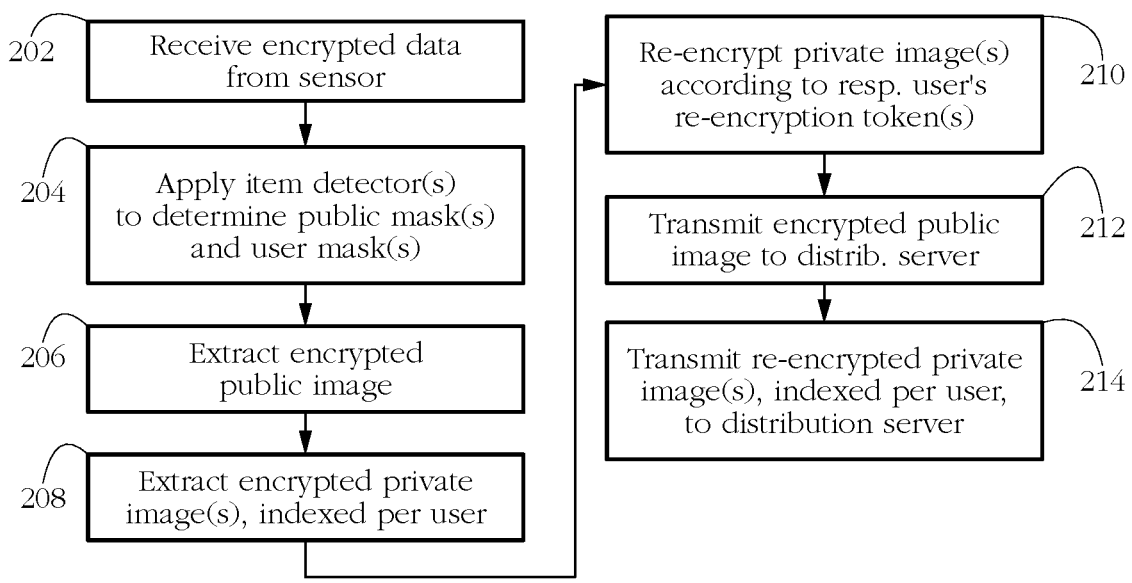
FIG. 12 shows an exemplary sequence of steps performed by the privacy management server in embodiments as illustrated in FIG. 11.
Figure 14:
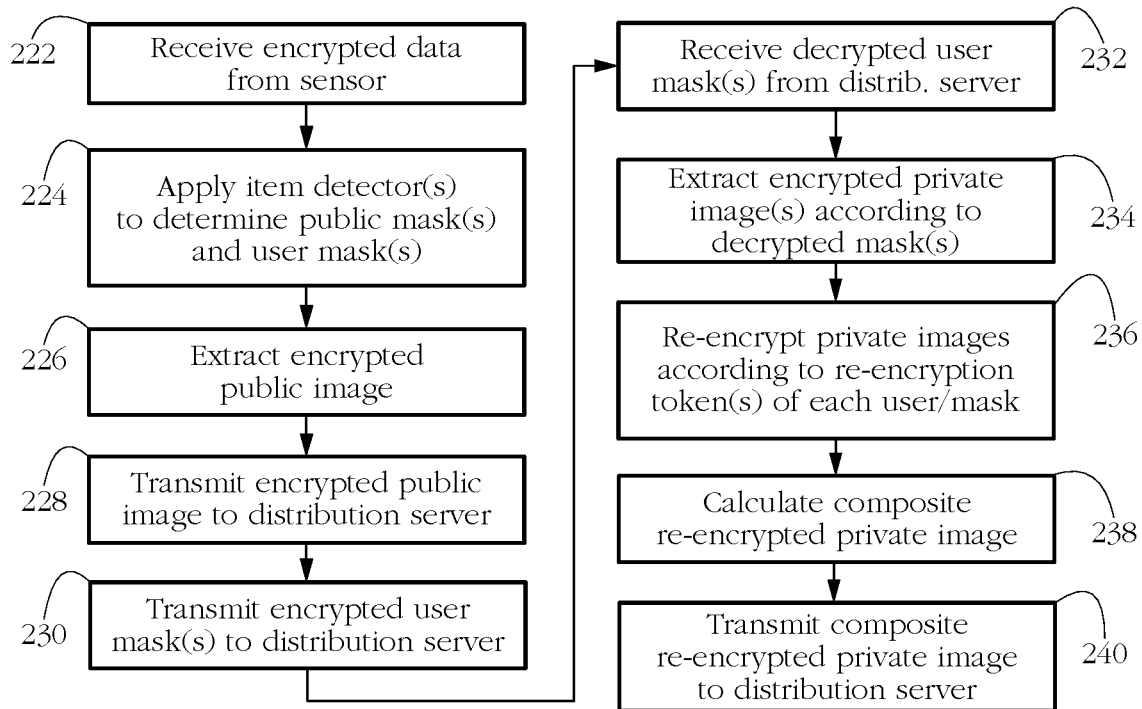
FIG. 14 shows an alternative exemplary sequence of steps carried out by the privacy management server in embodiments as illustrated in FIG. 13.
Figure 15:
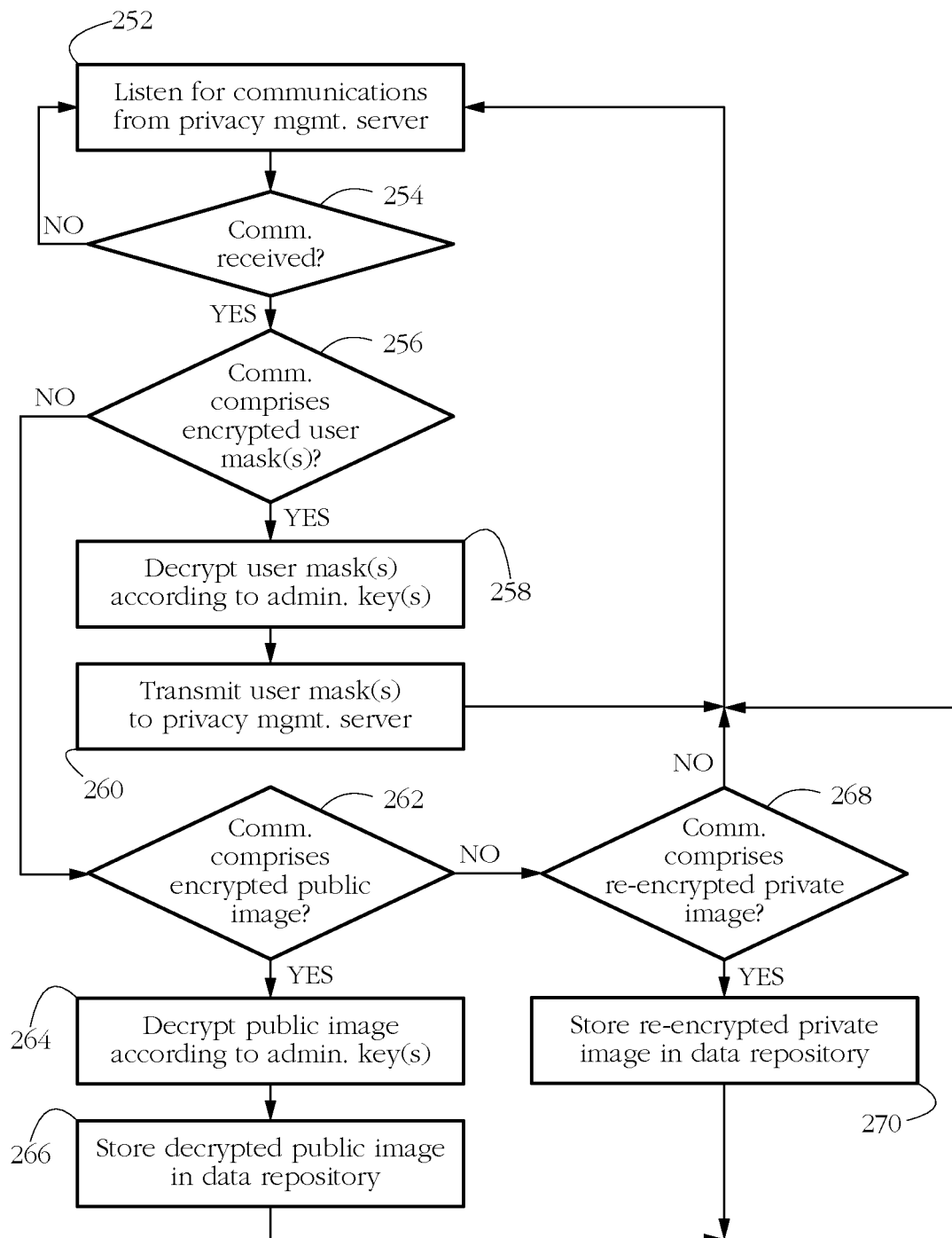
FIG. 15 illustrates an exemplary sequence of steps performed by the image distribution server according to some embodiments of the present invention.

FIGS. 12 and 14 show alternative sequences of steps carried out by privacy management server 40 in embodiments described by FIGS. 11 and 13, respectively. In turn, FIG. 15 shows exemplary steps carried out by image distribution server 30.

In some embodiments, data acquired by input sensor 14 is encoded as a plaintext image I, for instance comprising an array of numbers wherein each number represents an intensity of the respective image at a distinct position/pixel. Some images may have multiple channels (e.g. red, green, and blue); in such embodiments, each channel may be represented by a separate array. Image I is then encrypted by sensor cryptographic engine 16 according to public administration key(s) 52 to produce an encrypted data stream 60 that is transmitted to privacy management server 40. Stream 60 may comprise, for instance, a set of encrypted source images:

$$I^* = Enc(I, k_{admin}^P) \qquad [2]$$

wherein Enc(x, k) generically denotes an encryption of a quantity x using key k, and $k^P_{admin}$ denotes public administration key(s) 52. The star symbol (*) is used throughout to indicate encrypted quantities. In a video surveillance embodiment, each encrypted source image I* may correspond to a distinct frame and may be tagged with an associated timestamp indicative of a moment in time when the respective frame was taken.

In response to receiving data stream 60, for each encrypted source image I*, in a step 204 (FIG. 12), server 40 may apply item detector(s) 42 to determine whether the respective image comprises private data (i.e., images of items deemed private by some users). When yes, some embodiments of detector(s) 42 return a set of user masks (see exemplary mask 80a in FIG. 9) identifying regions of the source image that show various private items. Furthermore, such masks are indexed according to the users that have declared the respective items as private. Some embodiments may further determine a set of public masks comprising areas of the current frame that only contain public data. In an exemplary embodiment, a public mask is determined by inverting all user masks and superposing the results. In another embodiment, item detectors 42 may be trained to return a set of public masks along with user masks.

However, since privacy management server 40 does not possess the secret administration key(s) and thus cannot decrypt source image(s) I*, some embodiments of item detector(s) 42 operate in the encrypted domain, i.e., directly on encrypted data and produce an encrypted output (i.e., user masks are also encrypted). Therefore, in some embodiments, although item detectors 42 execute on server 40, server 40 is oblivious to the content of the source image, as well as to a what region of the source image contains a private item, if any.

In some embodiments, a set of steps 206-208 (FIG. 12) performs an encrypted-domain image segmentation procedure to extract a set of encrypted public and private images from the current source image I* according to an output of item detector(s) 42. Each private image may comprise an (encrypted) content of the current source image located within a distinct user mask.

In some embodiments, the encrypted private image associated with user mask i may be determined according to a pixel-wise multiplication of the encrypted source image and the encrypted mask i:

$$I^{*PRIVATE}_i = I^* \odot M^*_i, \qquad [3]$$

wherein $M^*_i$ denotes the encrypted user mask i returned by item detector(s) 42:

$$M^*_i = Enc(M_i, k^P_{admin}), \qquad [4]$$

and wherein $M_i$ denotes the unencrypted/plaintext user mask i.

The circled dot operator herein denotes pixel-wise multiplication:

$$(I \odot M^*_i)_{xy} = (I^*)_{xy} (M^*_i)_{xy}, \qquad [5]$$

wherein the pair {xy} indexes positions/pixels within the source image and user mask, respectively. Pixel-wise multiplication applies to images/arrays of the same size.

Meanwhile, an encrypted public image of the current frame (item 62 in FIG. 11) may be computed according to an element-wise multiplication of the encrypted source image and the encrypted public mask:

$$I^{*PUBLIC} = I^* \odot M^{*PUBLIC}, \qquad [6]$$

wherein $M*^{PUBLIC}$ denotes the encrypted public mask produced by item detector(s) 42:

$$M*^{PUBLIC} = Enc(M^{PUBLIC}, k_{admin}^P),\qquad [7]$$

wherein $M^{PUBLIC}$ denotes the respective unencrypted/plaintext public mask.

In some embodiments, in a step 210, privacy management server 40 may employ re-encryption engine 46 to proxy re-encrypt the private image(s) determined as seen above (e.g., formula [2]) according to a re-encryption token associated with the respective user/mask i, to produce an individual, user-specific re-encrypted private image 66 (FIG. 11), which is then transmitted to image distribution server 30. Such proxy re-encryption ensures that the respective private image is decipherable only by a holder of a decryption key associated with user/mask i. In some embodiments, re-encrypted private image 66 is tagged with an indicator of the respective user, to enable server 30 to selectively insert and/or retrieve image 66 into/from data repository 20. A further sequence of steps 212-214 transmits encrypted public image 62 and the re-encrypted private image(s) 66 to server 60 for further distribution to client devices 12*a-c*.

In an alternative embodiment illustrated in FIGS. 13-14, in a step 230, server 40 may transmit encrypted user mask(s) 64 to image distribution server 30 for decryption, and in response, receive decrypted user mask(s) 65 from server 30. In some embodiments, decrypted mask(s) 65 comprise plaintext versions of the encrypted user masks determined by item detector(s) 42:

$$M_i = Dec(M*_i, k_{admin}^s),\qquad [8]$$

wherein Dec(x, k) generically denotes a decryption of a quantity x using a key k, and wherein $k_{admin}^s$ denotes a secret cryptographic key held by image distribution server 30. In such embodiments, even though privacy management server 40 can clearly see whether and which region of the source image shows a private item, privacy is still preserved since server 40 cannot decrypt any region of the respective source image I*.

Next, a step 234 may extract private images by copying pixels of the encrypted frame located within each decrypted user mask 65. In some embodiments, this may amount to determining an encrypted private image associated with mask i as:

$$I*_i^{PRIVATE} = I* \odot M_i\qquad [9]$$

A further step 236 may employ re-encryption engine 46 to proxy re-encrypt each such private image with a re-encryption token of a user associated with the respective mask i, to produce individual re-encrypted private images. Next, in a step 238, some embodiments may compute a composite re-encrypted private image 67 according to multiple individual re-encrypted private images determined in step 236. In some embodiments, composite image 67 comprises a single image assembled from multiple private images in the manner of a mosaic wherein each individual re-encrypted private image occupies a region of the composite image corresponding to the respective user mask M. Calculating the composite private image may be facilitated by zero-padding each proxy re-encrypted private image to the size of the source image. Composite re-encrypted private image 67 may then be calculated according to:

$$I*^{COMP} = \oplus_i ReEnc(I*_i^{PRIVATE}, t_i),\qquad [10]$$

wherein ReEnc(x, t) generically denotes a proxy re-encryption of a ciphertext x using a token t, and $t_i$ denotes a re-encryption token associated with user/mask i. The circled plus operator herein denotes pixel-wise addition:

$$(I_1 \oplus I_2)_{xy} = (I_1)_{xy} + (I_2)_{xy},\qquad [11]$$

wherein the pair {xy} indexes positions/pixels within exemplary images $I_1$ and $I_2$, respectively. Pixel-wise addition is applicable to images of the same size.

The calculated composite re-encrypted private image 67 may then be transmitted to image distribution server in a step 240. In an alternative embodiment, privacy management server 40 may compute individual proxy re-encrypted private images and transmit the respective images to distribution server 30. In turn, server 30 may determine composite image 67 from the received individual re-encrypted images, for instance using Eq. [10].

Meanwhile (step 226 in FIG. 14), privacy management server 40 may compute encrypted public image 62 as shown above (e.g., Eq. [6]). Alternatively, image 62 may be determined according to a plaintext public mask:

$$I*^{PUBLIC} = I* \odot M^{PUBLIC},\qquad [12]$$

wherein $M^{PUBLIC}$ is received from distribution server 30. In yet another embodiment, $M^{PUBLIC}$ may be computed by inverting all plaintext user masks M, received from server 30 and superposing the results. In any of these situations, image 62 is encrypted with an administration key by virtue of the fact that server 40 performs image segmentation in the encrypted domain, i.e., without decrypting the source image. Stated otherwise, server 40 is unaware of the plaintext content of public image 62. In a step 228, encrypted public image 62 is transmitted to server 30 for decryption and further distribution to clients.

FIG. 15 illustrates an exemplary operation of image distribution server 30 according to some embodiments of the present invention. In a sequence of steps 252-254, server 30 may wait for communications from privacy management server 40. When such communications comprise encrypted user masks (step 256 returns a yes), image distribution server 30 may employ cryptographic engine 36 to decrypt the respective masks according to its secret administration key (e.g. formula [6] above), and transmit the decrypted mask(s) to privacy management server 40.

When the communication comprises encrypted public image 62, server 40 may decrypt it to yield a decrypted public image 63:

$$I^{PUBLIC} = Dec(I*^{PUBLIC}, k_{admin}^2)\qquad [13]$$

and save image 63 to data repository 20. Decrypted public image 63 may be tagged with a timestamp, frame number or another indicator associating image 63 to the source image it was extracted from.

When the communication received from server 40 comprises a re-encrypted private image (either specific to a user/mask i or composite, according to whether server 40 follows flowchart 12 or 14, respectively), image distribution server 30 may insert the respective private image into data repository 20. Re-encrypted private images may also be tagged according to a timestamp and/or a label associating the respective image(s) to a respective source image. Private images may also be tagged to indicate an association with a specific user and/or mask.

Figure 16:
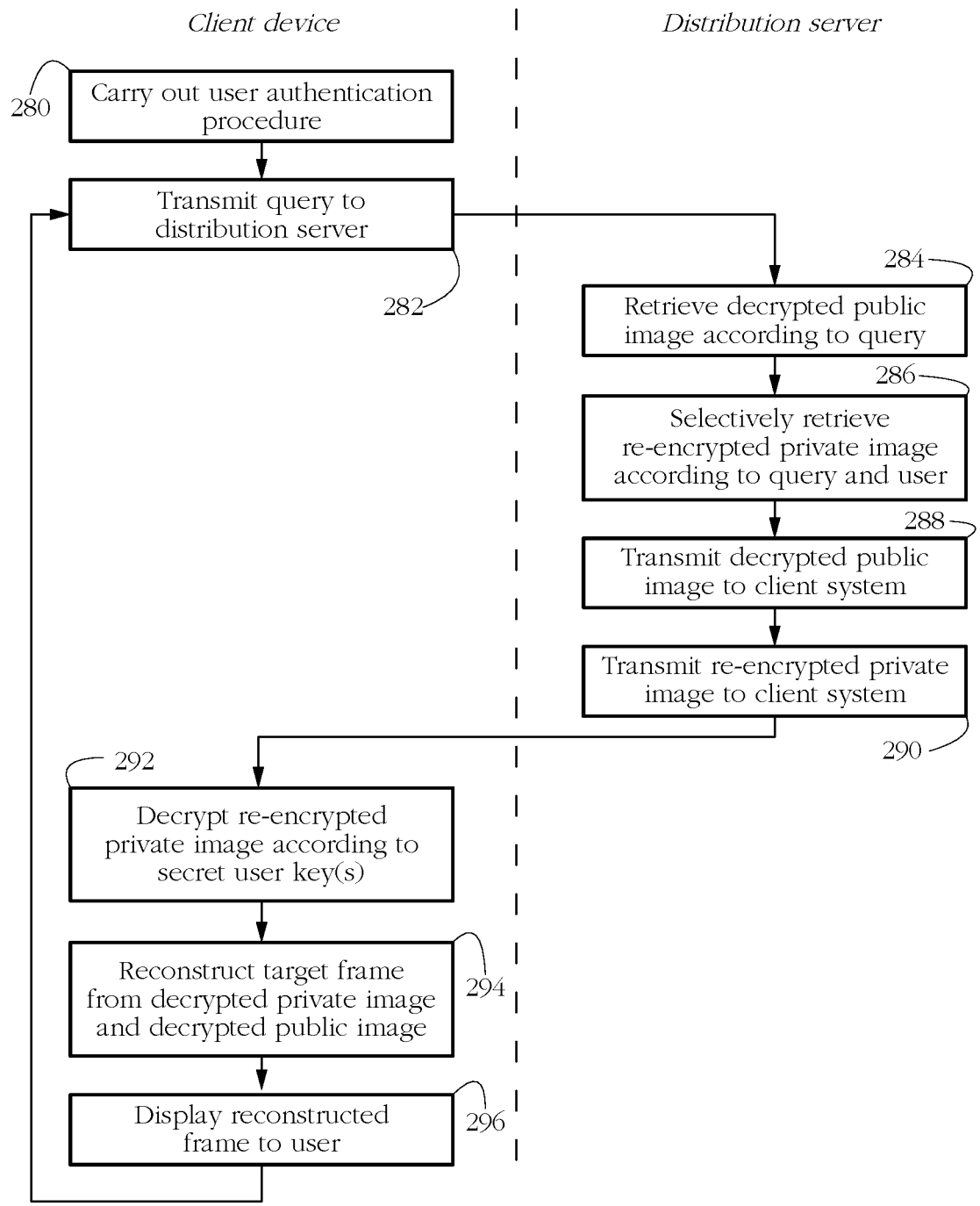
FIG. 16 shows an exemplary sequence of steps outlining an exchange between a client device and a distribution server according to some embodiments of the present invention.

FIG. 16 shows further exemplary steps performed by image distribution server 30 in relation to a client device 12 generically representing any of client devices 12*a-c* in FIG. 1. In a step 280, client device 12 may carry out a user authentication procedure to identify a current user of device 12 to distribution server 30. Step 280 may implement any user authentication protocol known in the art (e.g., password, two-factor, biometric, etc.). In a step 282, device 12 may then transmit a query to server 30, for instance to indicate a request to view images from a specific surveillance camera and captured within a specific timeframe. In response, in a sequence of steps 284-290, image distribution server 30 may selectively retrieve from data repository 20 a set of public and private images according to the query, and transmit the respective images to client device 12. Depending on whether privacy management server 40 operates according to flowcharts illustrated in FIG. 12 or 14, private image(s) may comprise individual re-encrypted private images 66 or composite re-encrypted private images 67, respectively. Such transactions may be carried out via a web interface, for instance. In an alternative embodiment, image distribution server 30 may open a dedicated connection (e.g., VPN tunnel) with client device 20, and transmit public and private image(s) via the respective connection.

A skilled artisan will understand that although public images have been decrypted to plaintext prior to distribution, step 288 does not necessarily comprise transmitting the respective public images in plaintext. Instead, step 288 may include re-encrypting the transmitted public image, for instance as part of a transmission over TLS/HTTPS. However, such an encryption has no effect on image reconstruction at the client device; in a TLS/HTTPS transaction the receiving client device can always decrypt the payload.

In response to receiving the public and private images, in a step 292, client device 12 may use client cryptographic engine 26 (FIG. 3) to decrypt the respective private images using a secret cryptographic key associated with the respective user of client device 12. Next, in a step 294, data reconstruction engine 24 may compute a reconstructed image according to the decrypted private image(s) and further according to decrypted public image 63 received from image distribution server 30. For instance, a reconstructed image may be computed via pixel-wise addition of decrypted public image 63 and a decrypted private image:

$$R_i = I^{PUBLIC} \oplus Dec[ReEnc(I^{*PRIVATE}_i, t_i), k_i^2] \quad [14]$$

or $$R_i = I^{PUBLIC} \oplus Dec(I^{*COMP}, k_i^s), \quad [15]$$

wherein $R_i$ denotes the reconstructed image seen by user i, and $k^s_i$ denotes a secret key of user i. When the source image comprises private data of multiple users, formula [14] may not compute an entire reconstructed image, in the sense that regions of the reconstructed image corresponding to user masks $M_j$ belonging to users distinct from the current user i of client device 12 may be empty. To get a full reconstructed image, some embodiments may fill the missing regions with dummy data, e.g., zeros, random noise, random colors, etc.

Reconstructing the frame according to formula [14] may be preferable in situations where masks associated with distinct users may be overlapping, for instance when some information may be relevant to multiple users (e.g., to members of a selected group), while other information is private to each user. Another example of such a situation may occur in an automatic image segmentation system configured to produce a multi-label classification.

In an embodiment wherein the reconstructed image is computed from a composite private image, reconstructed image $R_i$ is complete but the secret key $k^s_i$ held by user i can only decrypt the respective user's private data. Therefore, regions of the reconstructed image corresponding to user masks $M_j$ of other users will show scrambled images. This effect is illustrated in FIGS. 17-A-B, which show how two distinct users see reconstructions of the same source image. FIG. 17-A shows a reconstructed image seen by a user A that declared item 72a (FIG. 6) as being private. User A will see images of private item 72a, but will not be able to see images of other users' private items, such as images of items 72b-c-d (see FIG. 6). FIG. 17-B shows a reconstructed image seen by another user B for whom item 72b is private. User B may see images of item 72b, but may not be able to see images of private items 72a and 72c-d.

Reconstructing frame R according to formula [15], i.e., from composite encrypted private images, may be preferable in embodiments wherein item detectors 42 only produce non-overlapping user masks and/or wherein distinct users do not share private information. Otherwise, regions of the reconstructed image covered by mask overlaps may not be decipherable by any individual user, and therefore may appear scrambled. Operating with composite private images may further save computational resources, because it allows sending the same encrypted private data (i.e., one composite private image) to all users instead of storing, indexing, and selectively delivering individual private images to each user. In such embodiments, server 40 may directly insert private and public images into data repository 20, without further involvement of distribution server 30. A downside of embodiments using composite re-encrypted private images is that they ensure a relatively lower level of privacy compared to embodiments using individual private images, since in computing private images server 40 operates with decrypted/plaintext masks. Stated otherwise, although server 40 is oblivious to the content of the private images, it knows for instance whether a source image comprises a private item, and it also knows an approximate location of the respective private item via the respective plaintext mask.

Figure 18:
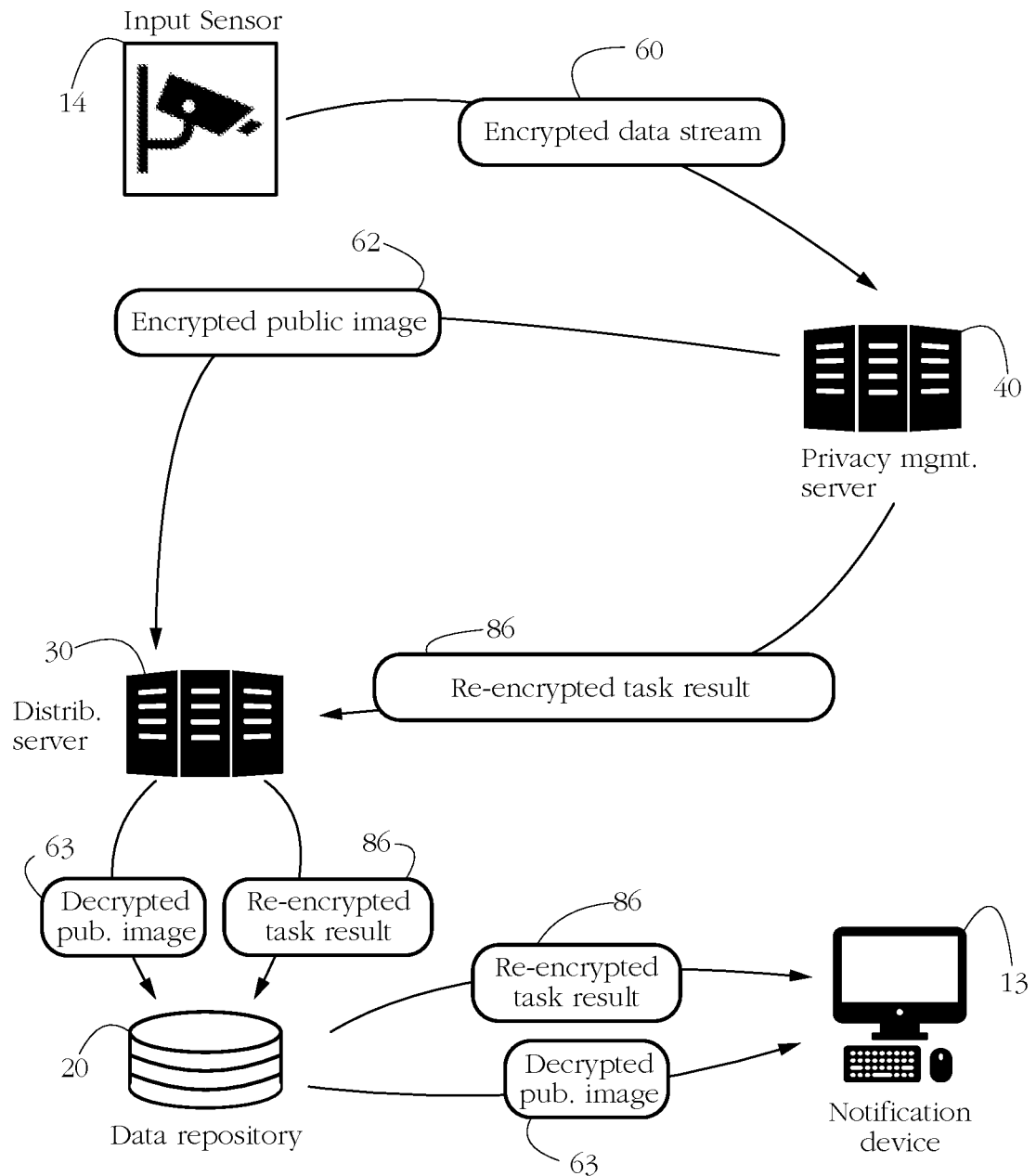
FIG. 18 shows an exemplary data exchange in an embodiment of the present invention configured to perform a selected task in a privacy-preserving manner.

FIG. 18 illustrates an enhancement of a privacy-preserving surveillance system according to some embodiments of the present invention. In some embodiments, privacy management server 40 (FIG. 5) is further endowed with an image task module 44 configured to carry out a specific task according to encrypted data stream 60 received from input sensor 14. One example of an image processing task comprises event detection (determining whether an image or sequence of images are indicative of an occurrence of a particular event). For instance, in a school surveillance embodiment, task module 44 may be configured to analyze images captured by a surveillance camera to determine whether the images are indicative of a fight or bullying incident. In a traffic monitoring embodiment, the task module may determine automatically whether a source image is indicative of an accident, traffic jam, etc. Other exemplary tasks include counting people in an image and determining whether said count exceeds a pre-determined threshold. Yet another exemplary task generically includes any image classification/labelling task, such as determining whether an image shows a particular type of object (e.g., weapon, personal ID, bank card, car license plate, etc.). An artisan will understand that although the above examples involve image processing, this aspect is not meant to be limiting and some embodiments may be adapted to processing other types of data such as sound files, text documents, etc. For instance, in a sound-processing embodiment, task module 44 may determine whether a sound captured by input sensor 14 is indicative of a gunshot, of people shouting, of insulting or discriminatory language, etc.

In some embodiments, task module 44 (FIG. 5) comprises an AI system 43b pre-trained to carry out the respective task. Several such examples are known in the art of computer vision; their architecture and training go beyond the scope of the present disclosure. AI system 43b may be pre-trained by AI training system 11 in the sense that system 11 may determine a set of optimized task module parameter values 45b (e.g., synapse weights, etc.) for instance via a machine learning process, and use values 45b to instantiate the runtime instance of image task module 44.

Task module 44 may operate in the encrypted domain, i.e., without decrypting source data. In such embodiments, module 44 may input an encrypted image and produce an encrypted output comprising a result of executing the respective task, the respective output encrypted with the public administrative key $K_{admin}^p$ associated with distribution server 30. For instance, the output of task module 44 may comprise an encrypted version of a verdict or label (e.g., YES/NO according to whether data stream 60 is indicative of an occurrence of a specific event or not). Since module 44 executes in the encrypted domain, privacy-management server 40 is not aware of the task result.

In some embodiments, the output of task module 44 is proxy re-encrypted by engine 46 (FIG. 5) using a re-encryption token of a selected user, to produce a re-encrypted task result 86 which is sent to distribution server 30 for delivery to a pre-determined notification device 13 (e.g., a smartphone of the selected user). In some embodiments, notification device 13 may also receive decrypted public image 63, so that the respective user may get to see the publicly available image data in addition to being notified of the occurrence of the respective event or situation. For instance, a school principal (or security personnel) may receive a notification that there is a fight under way on the school premises, but he/she may not be able to see who is actually involved in the fight when such information is deemed private. Meanwhile, since task result 86 is only decipherable by the selected notification device, all users except the school principal, may be oblivious of the occurrence of the fight. Furthermore, owners/operators of server 40 are also unaware of such events.

Some embodiments are further enhanced by the addition of a super user which may be allowed to see all private information contained in a source image. Such a super user may represent an authority figure such as a school principal, a representative of a human resources department of a company, etc. Upon setting up the surveillance service, image distribution server 30 may create a pair of cryptographic keys, as well as a set of re-encryption tokens associated with the super user. In one such exemplary embodiment, in response to determining user masks and extracting private images, privacy management server 40 may proxy re-encrypt extracted private images associated with all users with the re-encryption token(s) of the super user, thus creating a composite private image only accessible to the super user. The respective re-encrypted private data is then sent to image distribution server 30 and further made accessible to the super user together with decrypted public image 63. The super user may decrypt the respective re-encrypted private image and thus completely reconstruct the source image according to public image 63 and the decrypted composite private image. Meanwhile, a user who is not in possession of the private encryption key of the super user may not see private data belonging to another user.

Figure 19:
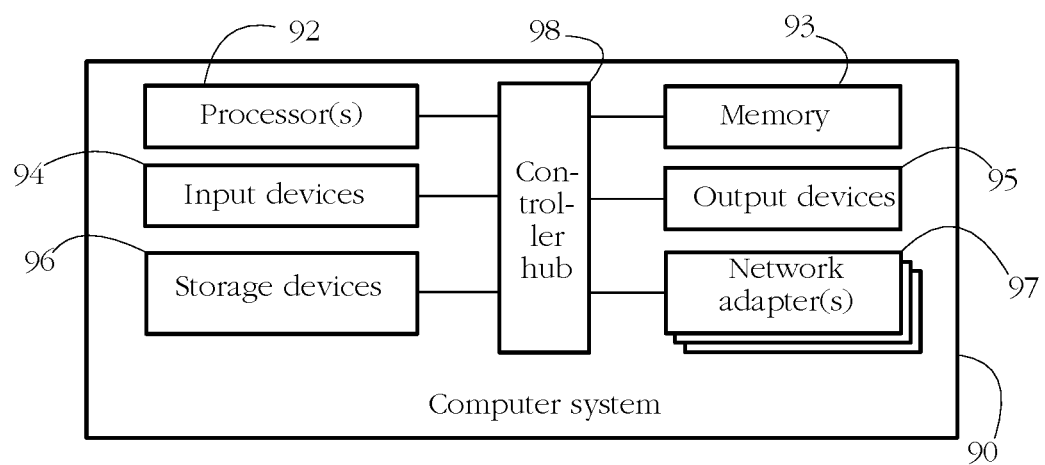
FIG. 19 illustrates an exemplary hardware configuration of a computing device configured to carry out operations according to some embodiments of the present invention.

FIG. 19 shows an exemplary computer system 90 configured to execute some of the methods described herein. Computer system 90 may represent any of client devices 12a-c, as well as image distribution server 30 and privacy management server 40. The illustrated hardware configuration is that of a personal computer; the configuration of other computing appliances such as mobile telephones and servers may differ slightly from the one shown in FIG. 19. Processor(s) 92 comprise a physical device (e.g. microprocessor, multi-core integrated circuit formed on a semiconductor substrate) configured to execute computational and/or logical operations with a set of signals and/or data. Such signals or data may be encoded and delivered to processor(s) 92 in the form of processor instructions, e.g., machine code. Processor(s) 92 may include a central processing unit (CPU) and/or an array of graphics processing units (GPU).

Memory unit 93 may comprise volatile computer-readable media (e.g. dynamic random-access memory—DRAM) storing data and/or instruction encodings accessed or generated by processor(s) 92 in the course of carrying out operations. Input devices 94 may include computer keyboards, mice, trackpads, and microphones, among others, including the respective hardware interfaces and/or adapters allowing a user to introduce data and/or instructions into computer system 90. Output devices 95 may include display devices such as monitors and speakers among others, as well as hardware interfaces/adapters such as graphic cards, enabling the respective computing device to communicate data to a user. In some embodiments, input and output devices 94-95 share a common piece of hardware (e.g., a touch screen). Storage devices 96 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 97 include mechanical, electrical, and signaling circuitry for communicating data over physical links coupled to an electronic communication network (e.g, network 15 in FIG. 1) and/or to other devices/computer systems. Adapter(s) 97 may be further configured to transmit and/or receive data using a variety of communication protocols.

Controller hub 98 generically represents the plurality of system, peripheral, and/or chipset buses, and/or all other circuitry enabling the communication between processor(s) 92 and the rest of the hardware components of computer system 90. For instance, controller hub 98 may comprise a memory controller, an input/output (I/O) controller, and an interrupt controller. Depending on hardware manufacturer, some such controllers may be incorporated into a single integrated circuit, and/or may be integrated with processor(s) 92. In another example, controller hub 98 may comprise a northbridge connecting processor 92 to memory 93, and/or a southbridge connecting processor 92 to devices 94, 95, 96, and 97.

The exemplary systems and methods described herein allow distributing data (e.g., recorded video, photographs, recorded audio, digital documents, etc.) to a plurality of users in a manner which preserves the privacy of the respective users. Some embodiments employ homomorphic encryption and proxy re-encryption techniques to manipulate the respective data so that selected portions of it are revealed according to an identity of the user currently accessing the respective data.

One exemplary application of some embodiments comprises video surveillance, wherein the distributed data includes a stream of images received from a surveillance camera. Some embodiments employ image recognition techniques to determine whether an image contains an item deemed confidential by a selected user (e.g., a specific person or face, a specific license plate, etc.), and manipulate and selectively encrypt the respective image so that only the respective user may see the confidential item. Meanwhile, other users may be given access to another version of the same image, wherein the confidential item is obscured (e.g., concealed, cut out, scrambled, etc.).

One exemplary use case comprises monitoring a schoolyard for signs of bullying, fights, and verbal aggression. In some embodiments, selected users (e.g., parents) may designate some of the children as private items. Images of the schoolyard captured by a video camera may be distributed to multiple users. However, images distributed to the school principal and the parent of a child deemed private will show the face of the respective child, while in images distributed to all other users the face may be obscured or scrambled. Such manipulations may for instance preserve the privacy of a bullied child and/or delay disclosing the identity of an aggressor until an investigation of the incident is carried out.

Applications of some embodiments are not limited to surveillance. In another example, a camera records a presentation of a product or prototype. The images are then transmitted to multiple remote users, for instance in a videoconference format. However, distinct users may receive distinct versions of the same image. For instance, users that have signed a non-disclosure agreement may be shown the respective product or prototype, while in images distributed to other users the respective item may be obscured/scrambled.

The nature of the items deemed private/confidential may differ greatly among embodiments. Some examples include, among others, an offensive hand gesture, an item of clothing (headscarf, swimsuit, etc.), an item of jewelry, a specific body part (bare leg, breast, etc.), a weapon, a company logo, a body lying on the ground (potentially a homeless person, or person in need of medical help), and a person in uniform (e.g., police, medical personnel). Artificial intelligence system 43 (FIG. 5) may be trained to recognize any such type of private item within a source image. Subsequently, some users will see an image of the respective items while others will not.

Many conventional video surveillance systems use encryption to prevent unauthorized access to the acquired images. Some such systems are also augmented with automatic image recognition and/or image segmentation functionality. However, conventional surveillance systems first decrypt the source images in preparation for image recognition. For instance, a conventional computer system performing image analysis typically also possesses the cryptographic keys for decrypting the source images. In contrast, by leveraging homomorphic encryption some embodiments of the present invention perform automatic item detection/mask construction directly in the encrypted domain, i.e., without first decrypting the source images. In particular, a privacy management server as described herein does not even have the keys for decrypting the source data. Consequently, in embodiments of the present invention, the computer system performing image recognition and/or segmentation is oblivious to the content of the analyzed images, which substantially enhances the privacy of the system's users.

The use of homomorphic encryption by some embodiments of the present invention also allows decoupling the user management/image distribution activities from the image analysis activities. In an exemplary privacy-preserving video surveillance system as illustrated in FIG. 1, servers 30 and 40 may be owned and operated by separate entities. In one exemplary use-case scenario illustrating the advantages of some embodiments of the present invention, a company A owns and operates input sensor(s) 14 and distribution server 30 and contracts out image processing services, i.e., services provided by server 40, to another company B. Sensors 14 may collect images from an office building, and company A may be interested to automatically detect events such as anomalous office dynamics, a presence of an unknown person, etc., to determine the attendance at certain office events, to determine when certain employees arrive at work or clock out, etc. Company B can provide such services in a privacy-preserving manner, since server 40 does not have access to unencrypted data and further lacks the information to decrypt the incoming source data. Instead, image segmentation and/or other task execution are carried out in the encrypted domain, and the results of such operations are only decryptable by computer systems (e.g., server 30, selected client devices 12*a-c*) operated by representatives of company A. Privacy is further strengthened by the fact that in embodiments as illustrated in FIGS. 11 and 13, distribution server 30 may not have access to the source data per se, but only to its "public part", i.e., the part of the source images that does not show private/confidential items.

Applications of some embodiments are not limited to image processing/video surveillance, and can be adapted to the processing of sound files, documents, and electronic messages, among others. In one such exemplary embodiment, a target person's voice may be selected as a private item. Source data such as a sound recording may be processed as shown herein, i.e., may be split into a private part and a public part, wherein the private part may consist of a segment of the source recording comprising utterances of the target person. The private part may then be proxy re-encrypted with a token corresponding to a selected subset of users. When reconstructing the respective sound recording, the selected users may bear the target person's speaking, while other users may not. Another exemplary embodiment may distort/scramble utterances of certain words (e.g., swearing, selected names, etc.).

In an exemplary document- or message-processing embodiment, private items may comprise certain names, addresses, telephone numbers, credit card or bank account numbers, etc. In some embodiments, private items may comprise entire parts of a document, for instance a specific section/chapter, parts having a specific author, parts addressing a specific subject. In yet another exemplary embodiment, private items may comprise parts of a conversation (e.g., electronic message exchange) that indicate a particular sentiment, such as anger, menace, suicidal thoughts, explicit sexual intent, etc. Item detectors 42 may use a set of rules or a pre-trained artificial intelligence system to automatically identify such private items in an encrypted source document. Using selective proxy re-encryption techniques as shown herein, the same document may then be distributed to multiple users in a manner wherein selected users may see the respective private items in plaintext, while other users may not.

It will be clear to one skilled in the art that the above embodiments may be altered in many ways without departing from the scope of the invention. Accordingly, the scope of the invention should be determined by the following claims and their legal equivalents.

What is claimed is:

1. A method of distributing customized privacy-preserving images to a plurality of users, the method comprising employing at least one hardware processor of a privacy management server to:
   in response to receiving an encrypted source image decryptable with an administration key, perform an encrypted-domain image segmentation of the source image to produce a plurality of user-specific encrypted private images, wherein:

a selected private image comprises a region of the source image selected to show a private item of a selected user of the plurality of users, another private image comprises another region of the source image selected to show a private item of another user of the plurality of users, and wherein determining the selected private image comprises:

employing a pre-trained item detector to calculate a mask identifying the region of the source image showing the private item of the selected user, the mask calculated in the encrypted domain and decryptable with the administration key, and determining the selected private image according to a pixel-wise multiplication of the encrypted source image and the mask;

in response to the image segmentation, perform an encrypted-domain key change procedure to produce a plurality of user-specific re-encrypted images, wherein:

a selected re-encrypted image comprises a result of transforming the selected private image from being decryptable with the administration key to being decryptable with a private key of the selected user, and another re-encrypted image comprises a result of transforming the other private image from being decryptable with the administration key to being decryptable with a private key of the other user; and transmit the plurality of user-specific re-encrypted images to an image distribution server for further distribution to client devices configured to reconstruct user-specific plaintext versions of the source image.

2. The method of claim 1, wherein:

performing the encrypted-domain image segmentation of the source image further comprises determining an encrypted public image comprising regions of the source image selected to show neither the private item of the selected user nor the private item of the other user;

wherein the method further comprises employing at least one hardware processor of the privacy management server to transmit the encrypted public image to the image distribution server for decryption and further distribution to client devices; and wherein the client devices are configured to reconstruct user-specific plaintext versions of the source image further according to a decrypted public image received from the image distribution server.

3. The method of claim 1, further comprising employing at least one hardware processor of the image distribution server to:

in response to receiving the selected re-encrypted image, select a device from a plurality of client devices according to whether the selected device is operated by the selected user; and in response to selecting the client device, transmit the selected re-encrypted image to the selected device.

4. The method of claim 3, further comprising employing at least one hardware processor of the image distribution server to:

in response to receiving the other re-encrypted image, select another device from the plurality of client devices according to whether the other device is operated by the other user; and in response to selecting the other device, transmit the other re-encrypted image to the other device.

5. The method of claim 1, wherein the encrypted source image is encrypted according to a homomorphic encryption scheme.

6. The method of claim 1, wherein a plaintext version of the source image reconstructed by a client device operated by the selected user shows the private item of the selected user and obscures the private item of the other user.

7. The method of claim 1, wherein the private item comprises an item selected from a group consisting of a person and a human face.

8. The method of claim 1, wherein the private item comprises a bank card.

9. The method of claim 1, wherein the private item comprises a trademark.

10. A computer system comprising a privacy management server configured to:

in response to receiving an encrypted source image decryptable with an administration key, perform an encrypted-domain image segmentation of the source image to produce a plurality of user-specific private images, wherein:

a selected private image comprises a region of the source image selected to show a private item of a selected user of the plurality of users, another private image comprises another region of the source image selected to show a private item of another user of the plurality of users, and wherein determining the selected private image comprises:

employing a pre-trained item detector to calculate a mask identifying the region of the source image showing the private item of the selected user, the mask calculated in the encrypted domain and decryptable with the administration key, and determining the selected private image according to a pixel-wise multiplication of the encrypted source image and the mask;

in response to the image segmentation, perform an encrypted-domain key change procedure to produce a plurality of user-specific re-encrypted images, wherein:

a selected re-encrypted image comprises a result of transforming the selected private image from being decryptable with the administration key to being decryptable with a private key of the selected user, and another re-encrypted image comprises a result of transforming the other private image from being decryptable with the administration key to being decryptable with a private key of the other user; and transmit the plurality of user-specific re-encrypted images to an image distribution server for further distribution to client devices configured to reconstruct user-specific plaintext versions of the source image.

11. The computer system of claim 10, wherein:

performing the encrypted-domain image segmentation of the source image further comprises determining an encrypted public image comprising regions of the source image selected to show neither the private item of the selected user nor the private item of the other user;

wherein the privacy management server is further configured to transmit the encrypted public image to the image distribution server for decryption and further distribution to client devices; and wherein the client devices are configured to reconstruct user-specific plaintext versions of the source image further according to a decrypted public image received from the image distribution server.

12. The computer system of claim 10, further comprising the image distribution server and wherein the image distribution server is further configured to:
   in response to receiving the selected re-encrypted private image, select a device from a plurality of client devices according to whether the selected device is operated by the selected user; and
   in response to selecting the client device, transmit the selected re-encrypted private image to the selected device.

13. The computer system of claim 12, wherein the image distribution server is further configured to:
   in response to receiving the other re-encrypted private image, select another device from the plurality of client devices according to whether the other device is operated by the other user; and
   in response to selecting the other device, transmit the other re-encrypted private image to the other device.

14. The computer system of claim 10, wherein the encrypted source image is encrypted according to a homomorphic encryption scheme.

15. The computer system of claim 10, wherein a plaintext version of the source image reconstructed by a client device operated by the selected user shows the private item of the selected user and obscures the private item of the other user.

16. The computer system of claim 10, wherein the private item comprises an item selected from a group consisting of a person and a human face.

17. The computer system of claim 10, wherein the private item comprises a bank card.

18. The computer system of claim 10, wherein the private item comprises a trademark.

19. A non-transitory computer-readable medium storing instructions which, when executed by at least one hardware processor of a privacy management server, cause the privacy management server to:
   in response to receiving an encrypted source image decryptable with an administration key, perform an encrypted-domain image segmentation of the source image to produce a plurality of user-specific private images, wherein:
      a selected private image comprises a region of the source image selected to show a private item of a selected user of the plurality of users,
      another private image comprises another region of the source image selected to show a private item of another user of the plurality of users, and
      wherein determining the selected private image comprises:
         employing a pre-trained item detector to calculate a mask identifying the region of the source image showing the private item of the selected user, the mask calculated in the encrypted domain and decryptable with the administration key, and
         determining the selected private image according to a pixel-wise multiplication of the encrypted source image and the mask;
   in response to the image segmentation, perform an encrypted-domain key change procedure to produce a set of user-specific re-encrypted images, wherein:
      a selected re-encrypted image comprises a result of transforming the selected private image from being decryptable with the administration key to being decryptable with a private key of the selected user, and
      another re-encrypted image comprises a result of transforming the other private image from being decryptable with the administration key to being decryptable with a private key of the other user; and
   transmit the plurality of user-specific re-encrypted images to an image distribution server for further distribution to client devices configured to reconstruct user-specific plaintext versions of the source image.

\* \* \* \* \*